(12) United States Patent
Yoshikawa

(10) Patent No.: US 9,764,575 B2
(45) Date of Patent: Sep. 19, 2017

(54) COLOR-MEASURING APPARATUS, PRINT CONTROL APPARATUS, AND PRINT CONTROL METHOD

(71) Applicant: Seiko Epson Corporation, Tokyo (JP)

(72) Inventor: Eishin Yoshikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/937,074

(22) Filed: Nov. 10, 2015

(65) Prior Publication Data

US 2016/0142589 A1    May 19, 2016

(30) Foreign Application Priority Data

Nov. 14, 2014    (JP) .................................. 2014-231165

(51) Int. Cl.
| | |
|---|---|
| *B41J 29/393* | (2006.01) |
| *G06F 3/12* | (2006.01) |
| *H04N 1/60* | (2006.01) |
| *G01J 3/46* | (2006.01) |

(52) U.S. Cl.
CPC .......... *B41J 29/393* (2013.01); *G06F 3/1208* (2013.01); *G06F 3/1229* (2013.01); *H04N 1/6041* (2013.01); *H04N 1/6044* (2013.01); *G01J 3/46* (2013.01)

(58) Field of Classification Search
CPC combination set(s) only.
See application file for complete search history.

(56) References Cited

U.S. PATENT DOCUMENTS

| | | | |
|---|---|---|---|
| 8,264,704 B2* | 9/2012 | Jackson | H04N 1/00002 358/1.14 |
| 8,817,329 B2 | 8/2014 | Satoh et al. | |
| 9,277,076 B2* | 3/2016 | Abe | H04N 1/00819 |
| 2003/0007023 A1* | 1/2003 | Barclay | B41J 2/17509 347/8 |
| 2006/0285134 A1* | 12/2006 | Viturro | G03G 15/01 358/1.9 |
| 2007/0030525 A1* | 2/2007 | Ono | H04N 1/6033 358/406 |
| 2009/0262373 A1* | 10/2009 | Takahashi | B41J 29/393 358/1.9 |

FOREIGN PATENT DOCUMENTS

| | | |
|---|---|---|
| JP | 2011-201216 A | 10/2011 |
| JP | 2013-192212 A | 9/2013 |

* cited by examiner

*Primary Examiner* — Barbara Reinier
(74) *Attorney, Agent, or Firm* — Global IP Counselors, LLP

(57) ABSTRACT

A color-measuring apparatus includes an imaging unit that images a test pattern and obtains image information of the test pattern, a reference color-measuring unit that color-measures the test pattern and obtains a reference color measurement value of the test pattern, and an amending unit that obtains the color measured result of the test pattern in a narrow range in at least one direction in comparison with a measuring range for obtaining the reference color measurement value by the reference color-measuring unit based on at least the image information and the reference color measurement value.

16 Claims, 14 Drawing Sheets

COLOR-MEASURING APPARATUS, PRINT CONTROL APPARATUS, AND PRINT CONTROL METHOD

CROSS-REFERENCE TO RELATED APPLICATIONS

This application claims priority under 35 U.S.C. §119 to Japanese Application No. 2014-231165 filed on Nov. 14, 2014, the content of which is hereby incorporated by reference in its entirety.

BACKGROUND

1. Technical Field

The present invention relates to a color-measuring apparatus, a print control apparatus, and a print control method.

2. Related Art

As a recording apparatus, for example, an ink jet printer which discharges ink droplets from a recording head to a printing medium has been known. In addition, for adjusting a color of an image being printed on the printing medium, the ink jet printer performs printing of test patterns on the printing medium, reads printed media of the test patterns by a scanner, and calculates a correction value correcting print data for forming a printing image based on a read value of the test pattern. In JP-A-2011-201216, a method is disclosed in which the concentration unevenness (spot) corresponding to a dot row is corrected by calculating the correction value for correcting a recording concentration in every dot row (raster).

As the ink jet printer, there is a large printer which performs printing on a printing medium having a relatively large size, for example, a roll sheet having a width of an A0-sized sheet, an A1-sized sheet, or the like of Japanese Industrial Standards (JIS). In such a large-sized printer, since a printing width thereof does not fit to a reading width of the scanner, it is not possible to obtain the correction values in every dot row with the above described method, and it is not possible to correct the concentration unevenness in every dot row of the printing image. In addition, if the scanner does not exist, a correction in the same manner cannot be performed.

Moreover, problems described above is not limited to the large-sized printer or an ink jet printer, and further, not limited to the recording apparatus, the same problems exist with regard to various apparatuses.

SUMMARY

An advantage of some aspects of the invention is to provide a technology which can accurately perform color-measuring in a narrow range of the test patterns.

According to an aspect of the invention, there is provided a color-measuring apparatus including: an imaging unit that images a test pattern and obtains image information of the test pattern; a reference color-measuring unit that color-measures the test pattern and obtains a reference color measurement value of the test pattern; and an amending unit that obtains the color measured result of the test pattern in a narrow range in at least one direction in comparison with a measuring range for obtaining the reference color measurement value by the reference color-measuring unit based on at least the image information and the reference color measurement value.

In the aspect, a technology which is possible to accurately perform color-measuring in the narrow range of the test patterns can be provided.

According to another aspect of the invention, there is provided a print control apparatus including: an imaging unit that images a test pattern printed on a printing medium and obtains image information of the test pattern; a reference color-measuring unit that color-measures the test pattern and obtains a reference color measurement value of the test pattern; and a correction unit that corrects a color of the printing image in a narrow range in at least one direction in comparison with a measuring range for obtaining the reference color measurement value by the reference color-measuring unit based on at least the image information and the reference color measurement value.

In the aspect, a technology which is possible to accurately perform a correction of color in the narrow range of the printing image can be provided.

Further, the invention can be applied to a composite apparatus such as a recording apparatus including a print control apparatus, a color-measuring method including a process corresponding to each unit described above, a print control method, a process method for a composite apparatus including a print control method, a color-measuring program which causes a computer to execute a function corresponding to each unit described above, a print control program, a process program for a composite apparatus including the print control program, a computer readable medium storing these programs, or the like. The apparatuses described above may be configured to have distributed multiple parts.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described. Of course, the embodiment described below is just examples of the invention, and all of features described in the embodiment do not need to be means to solve problems of the invention.

1. Outline of Present Technology

First, an outline of the present technology will be described with reference to FIGS. 1 to 14.

Figure 1:
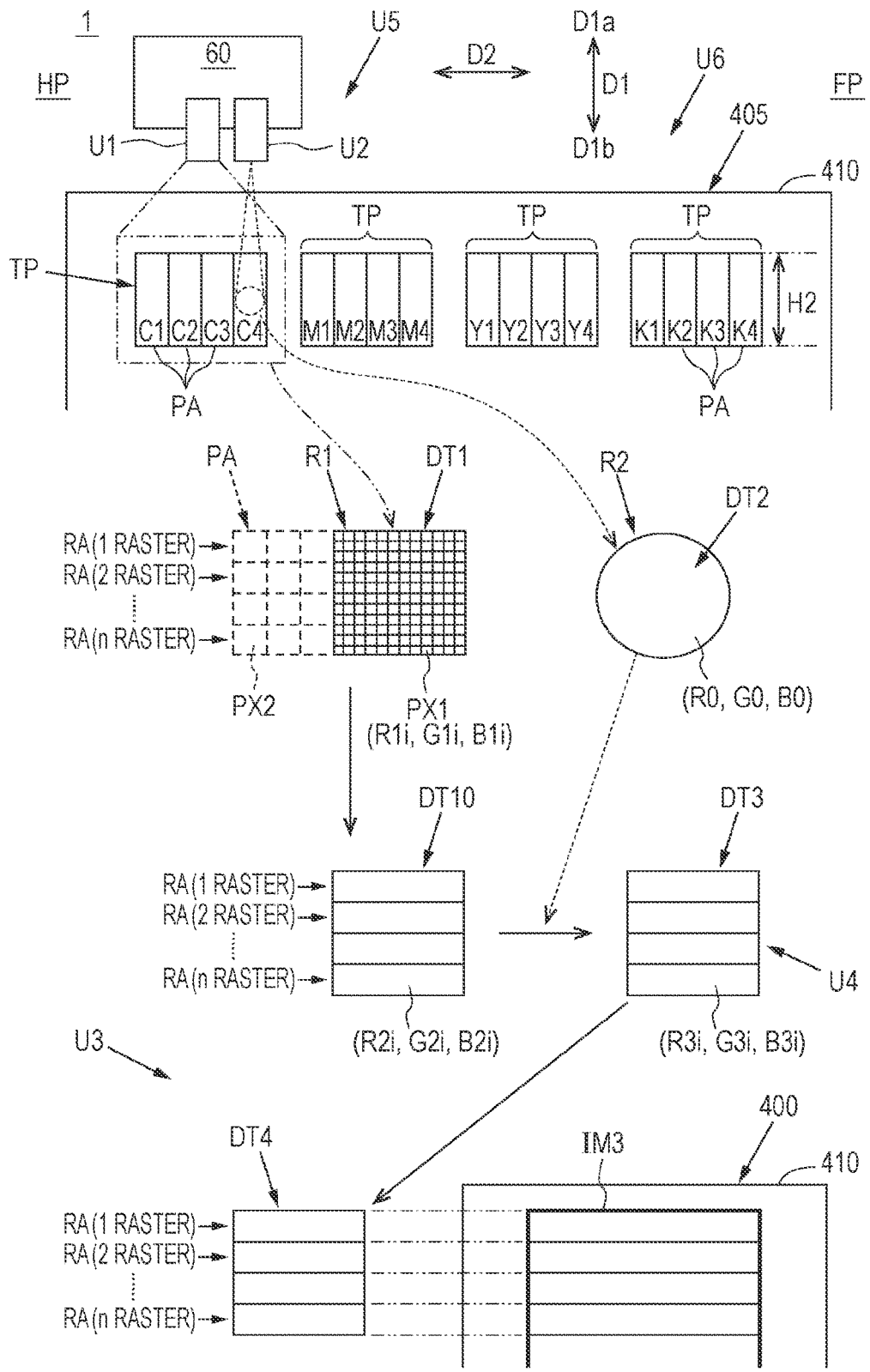
FIG. 1 is a diagram schematically illustrating an example in which a correction of color of a printing image is performed by obtaining a color measured result of test patterns using an area sensor and a color-measuring sensor.

A color-measuring apparatus illustrated in FIG. 1, or the like (for example, print control apparatus 1) includes an imaging unit (for example, area sensor U1), a reference color-measuring unit (for example, color-measuring sensor U2), and an amending unit U4. The imaging unit (U1) obtains image information DT1 of a test pattern TP by imaging a test pattern TP. The reference color-measuring unit (U2) obtains the reference color measurement value DT2 of the test pattern TP by color-measuring the test pattern TP. The amending unit U4 obtains the color measured result DT3 of the test pattern PT within a narrow range (for example, raster RA) in at least one direction (for example, the transportation direction D1) in comparison with the measuring range R2 for obtaining the reference color measurement value DT2 by the reference color-measuring unit (U2) based on at least the image information DT1 and the reference color measurement value DT2.

In a case of calculating the color measured result DT3 of the test pattern TP in the narrow range (RA) in at least one direction in comparison with the measuring range R2 of the reference color-measuring unit (U2), the color measured result DT3 cannot be obtained by only the reference color-measuring unit (U2). The technology is a technology obtaining the image information DT1 of the test pattern TP, and the color measured result DT3 of the test pattern TP within the narrow range (RA) in at least one direction in comparison with the measuring range R2 of the reference color-measuring unit (U2) is obtained based on at least the image information DT1 and a reference color measurement initial value. Accordingly, the technology can provide the color-measuring apparatus which is possible to perform reliably measure a color within the narrow range of the test pattern TP.

Here, the test pattern TP may be an image in a certain concentration formed of one type color material, may be a plurality of patterns having concentration different from each other, or may be a pattern formed of two or more types color materials.

The "narrow range" for obtaining the color measured result of the test pattern may be a range completely including the measuring range of the reference color-measuring unit, for example, may be a range of a substantial dot shape such as one pixel or 2×2 pixels, or may be a range from the measuring range of the reference color-measuring unit in a direction to the outside, for example, a substantial line shape such as 1 raster or 2 raster. When the "narrow range" is the range of substantial line shape, the range of substantial line shape in a direction orthogonal to a length direction of the substantial line shape range is narrower than the measuring range of the reference color-measuring unit.

Obtaining the color measured result based on the image information and the reference color measurement value includes obtaining the color measured result based on the image information, the reference color measurement value, and other information.

The color-measuring apparatus (1) may include a driving unit U5 which relatively moves the imaging unit (U1) and the reference color-measuring unit (U2), and the test pattern TP. In this case, the test pattern TP relatively moved within the imaging range R1 for obtaining the image information DT1 by the imaging unit (U1) may be imaged by the imaging unit (U1). In addition, the reference color-measuring unit (U2) may color-measure the test pattern TP relatively moved within the measuring range R2. This aspect can provide a color-measuring apparatus which is appropriate to obtain the color measurement values from many patterns.

Here, regarding relative moving of the imaging unit and the reference color-measuring unit, and the test pattern, there are cases of moving the imaging unit and the reference color-measuring unit without moving the test pattern, moving the test pattern without moving the imaging unit and the reference color-measuring unit, and moving all of the imaging unit, the reference color-measuring unit, and the test pattern.

In addition, the print control apparatus 1 exemplified in FIG. 1 includes the imaging unit (U1), the reference color-measuring unit (U2), and the correction unit U3. The imaging unit (U1) obtains the image information DT1 of the test pattern TP by imaging the test pattern TP printed on a printing medium 410. The reference color-measuring unit (U2) obtains the reference color measurement value of the test pattern TP DT2 by color-measuring the test pattern TP. The correction unit U3 corrects a color of a printing image IM3 within the narrow range (RA) in at least one direction in comparison with the measuring range R2 for obtaining the reference color measurement value DT2 by the reference color-measuring unit (U2), based on at least the image information DT1 and the reference color measurement value DT2.

When the color measured result DT3 of the test pattern TP in a narrow range (RA) is calculated in at least one direction in comparison with the measuring range R2 of the reference color-measuring unit (U2) for correcting the color of the printing image IM3, the color measured result DT3 cannot be obtained by only the reference color-measuring unit (U2). The technology is used to obtain the image information DT1 of the test pattern TP, and to correct the color of the printing image IM3 in the narrow range (RA) in at least one direction in comparison with the measuring range R2 of the reference color-measuring unit (U2) based on at least the image information DT1 and the reference color measurement initial value. Accordingly, the technology can provide a print control apparatus which is capable of accurately performing a correction of color of the narrow range of the printing image.

Here, in a concept of color of the printing image, there is a concept of concentration of the printing image (for example, concentration unevenness).

The print control apparatus 1 may include the driving unit U5 which relatively moves the imaging unit (U1) and the reference color-measuring unit (U2), and the printing medium 410. In this case, the test pattern TP relatively moved within the imaging range R1 for obtaining the image information DT1 by the imaging unit (U1) may be imaged by the imaging unit (U1). In addition, the test pattern TP relatively moved within the measuring range R2 may be imaged by the reference color-measuring unit (U2). The aspect can provide a print control apparatus which is appropriate to correct a color of the printing image by obtaining the color measurement value from the test pattern printed on a large printing medium.

Moreover, the printing medium (print substrate) is a material on which the printing image is held. The shape thereof is generally rectangle; however, it may be a circle (for example, optical disk such as CD-ROM, and DVD), a triangle, a square, or a polygon. Also, the printing medium includes at least all of a type of paper and paperboard and a processed product which is disclosed in JIS (Japanese Industrial Standards) P 0001:1998 (Terms of paper and paperboard, and pulp). Resin sheets, metal plates, three-dimension object, and the like are also included in the printing medium.

The driving unit U5 may include a head mounting unit (for example, carriage 60) on which a recording head 61 forming the printing image IM3 is mounted with respect to the printing medium 410. In addition, the driving unit U5 may relatively move the head mounting unit (60) and the printing medium 410. The imaging unit (U1) and the reference color-measuring unit (U2) may be mounted on the head mounting unit (60). The aspect can provide a print control apparatus which is appropriate to relatively move the imaging unit and the reference color-measuring unit, and the printing medium.

Here, relative moving the head mounting unit and the printing medium includes moving the head mounting unit without moving the printing medium, moving the printing medium without moving the head mounting unit, and moving both of the head mounting unit and the printing medium. An example of a recording apparatus in which the head mounting unit is moved without moving the printing medium when the ink droplets are ejected so as to form dots, includes, for example, a serial printer including a carriage. An example of a recording apparatus in which the printing medium is moved without moving the head mounting unit when the ink droplets are ejected so as to form dots, includes, for example, a line printer including a head mounting unit which fixes the recording head.

A range which corrects a color of the printing image IM3, may be a unit BD of a raster RA along the relative moving direction (D2) of the head mounting unit (60) and the printing medium 410. The aspect can provide a print control apparatus which is capable of accurately perform a correction of color in the unit of raster with respect to the printing image along the relative moving direction.

Figure 13:
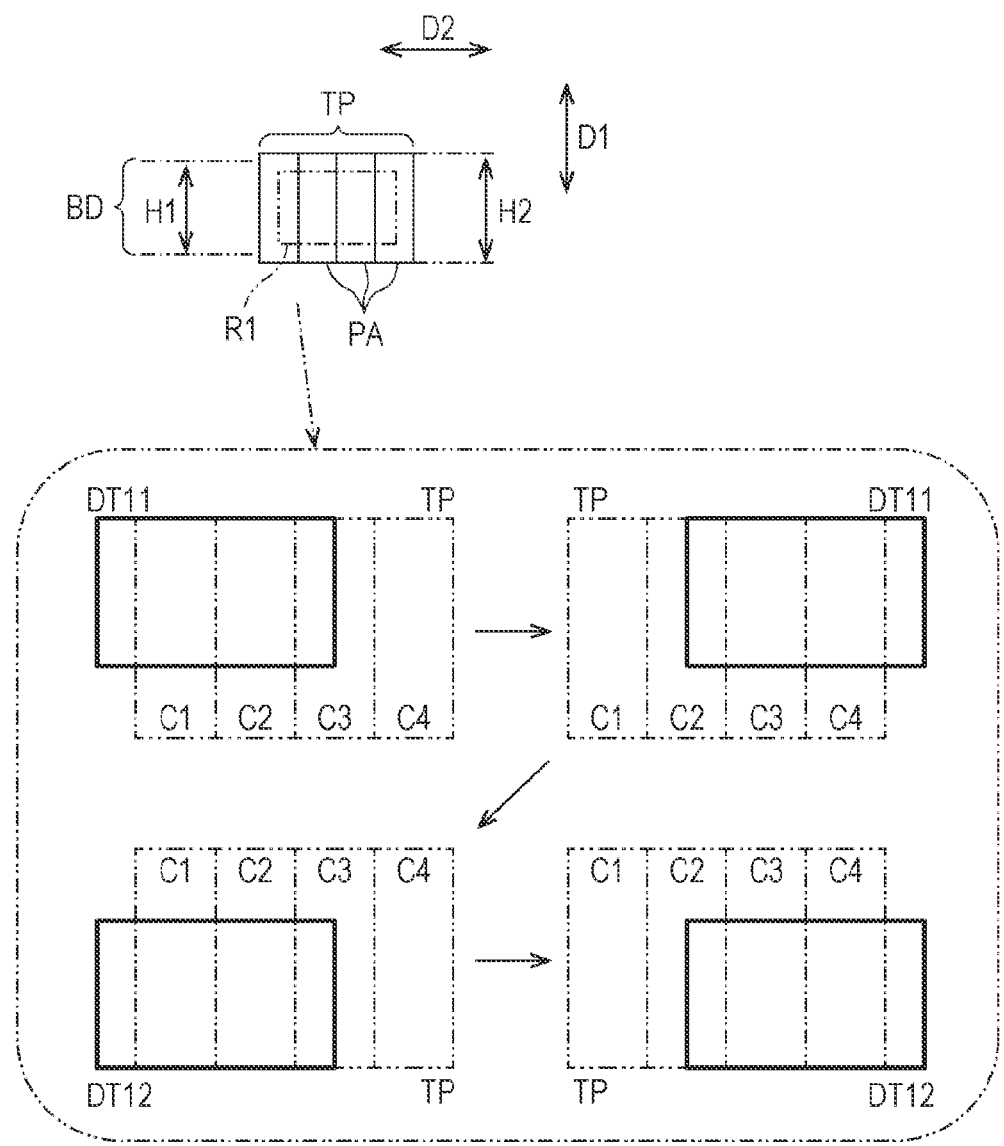
FIG. 13 is a diagram schematically illustrating an example in which the test patterns are imaged by being divided.

As illustrated in FIG. 13, or the like, a length H2 of the test pattern TP in the transportation direction D1 may be equal to or longer than a length H1 of the unit BD in which a formation of the dots DOT is terminated with respect to the printing medium 410 in the transportation direction D1. When the length H1 of the unit BD in the transportation direction D1 is longer than the imaging range R1, at least, the correction unit U3 may correct the color of the printing image IM3 based on a plurality of the image information DT1 and the reference color measurement values DT2 obtained by differing a transportation position of the printing medium 410 and imaging the test pattern TP. The aspect can obtain information of the length H1 of the unit BD or more even when the test pattern TP in the transportation direction D1 is long. The aspect can provide a print control apparatus which is capable of further accurately performing the correction of color of a narrow range with respect to the printing image.

Here, the length of the unit in which a formation of dots the printing medium in the transportation direction are terminated is determined according to a printing manner. For example, when a band printing in which all dots corresponding to a nozzle row of the recording head are formed is performed by mainly scanning the recording head with respect to the printing medium in one time, one band corresponding to an amount of transportation of the printing medium in one time becomes the unit. In addition, when pseudo band printing in which all dots corresponding to the nozzle row of the recording head are formed is performed by mainly scanning the recording head in X times (X indicates two or more of integer) with respect to the printing medium, a region corresponding to an amount in which the printing medium is transported in X times becomes the unit. Further, when an interlaced print is performed which makes the ink droplets ejected from the nozzles arranged side by side in an arrangement direction of nozzles land on pixels which are not arranged side by side in the transportation direction, and makes the ink droplets land on pixels between positions where the ink droplets do not land by passing to be performed later (mainly scanning), the amount in which the printing medium is transported in one time becomes the unit. The pixel can allocate a color independently so as to become a least element forming an image.

The correction unit U3 may correct the color of the printing image IM3 based on the reference color measurement value DT2, the first image information DT11 and the second image information DT12 in which pieces of information having the overlapped imaging range are averaged, out of the first image information DT11 and the second image information DT12 obtained by making the transportation position of the printing medium 410 different so as to make parts of the imaging range R1 overlap with each other and imaging the test pattern TP. The aspect can provide a print control apparatus in which an average information is included out of a unoverlapped part of the first image information DT11 and a unoverlapped part of the second image information DT12 in the transportation direction D1, which is capable of further accurately performing the correction of color of the narrow range with respect to the printing image.

Moreover, "first" and "second" are used to identify each configuration element of a plurality of the configuration elements when there is the plurality of the same configuration elements. Accordingly, a case of three or more pieces of the image information is included in this technology.

The print control apparatus 1 may have the test pattern printing unit U6 which performs printing the test pattern TP on the printing medium 410 transported by the transportation unit (53) by the recording head 61 mounted on the head mounting unit (60) being scanned. The correction unit U3 may control the transportation unit (53) to return the printing medium 410 for printing the test pattern TP in a direction D1b opposite to the transported direction D1a of the printing medium 410 in the transportation direction D1, and allow the imaging unit (U1) to image the test pattern TP and the reference color-measuring unit (U2) to color-measure the test pattern TP. Since the test pattern TP printed on the printing medium 410 is automatically imaged and color-measured, the aspect can improve convenience.

Figure 11:
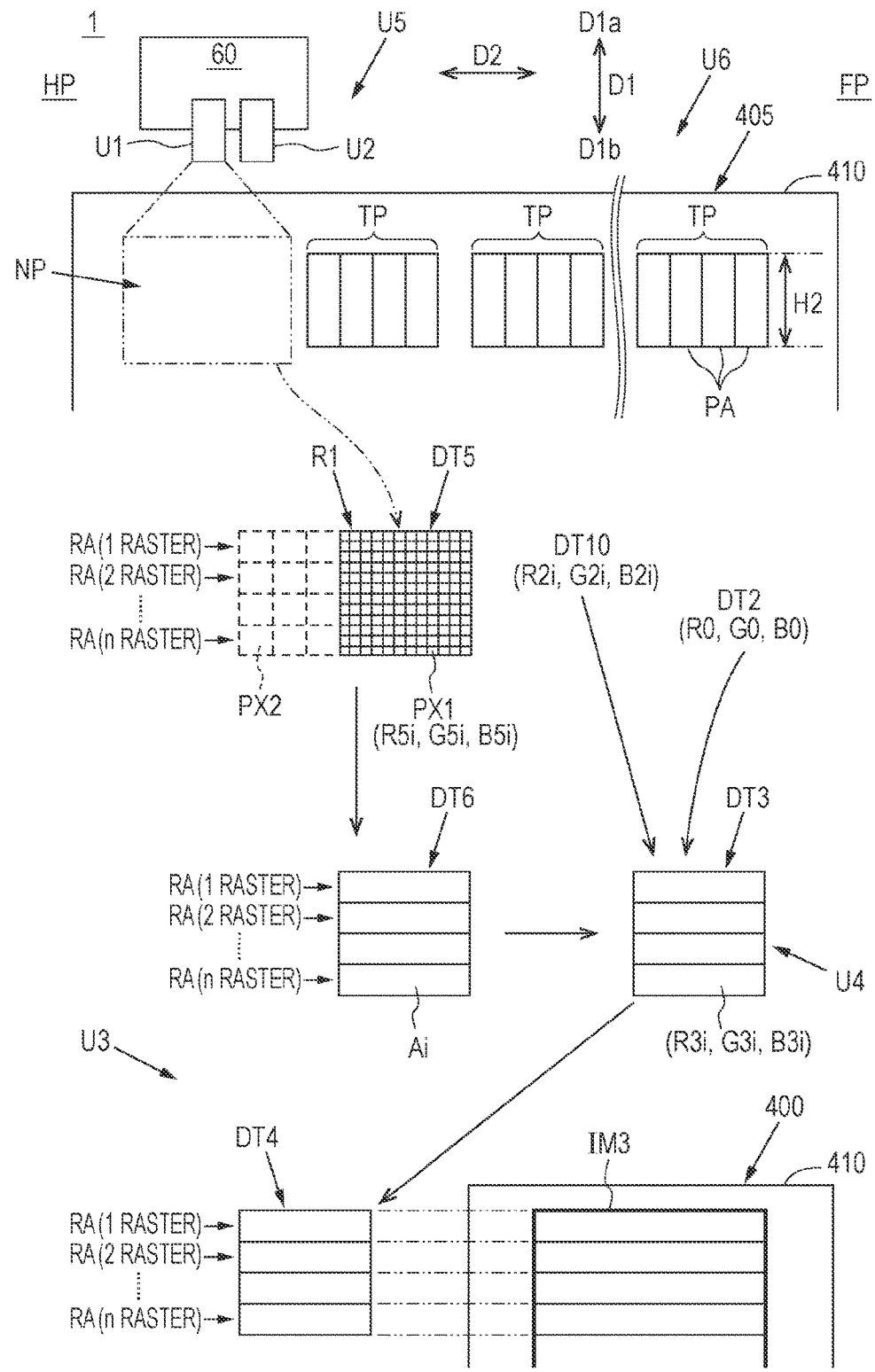
FIG. 11 is a diagram schematically illustrating an example of a correction of the difference within the imaging range of the area sensor.

As exemplified in FIG. 11, or the like, the imaging unit (U1) may obtain the printing medium image information DT5 by imaging the printing medium 410 of a region (NP)

where the test pattern TP is not printed. The correction unit U3 may correct the color of the printing image IM3 so as to reduce a difference of brightness (for example, brightness or luminance) by a position of the imaging range R1 for obtaining the image information DT1 by the imaging unit (U1) based on the printing medium image information DT5. Since the color of the printing image IM3 is corrected so as to reduce the difference of brightness by a position of the imaging range R1, the aspect can provide a print control apparatus which is capable of more accurately performing the correction of color within the narrow range with respect to the printing image.

Figure 2:
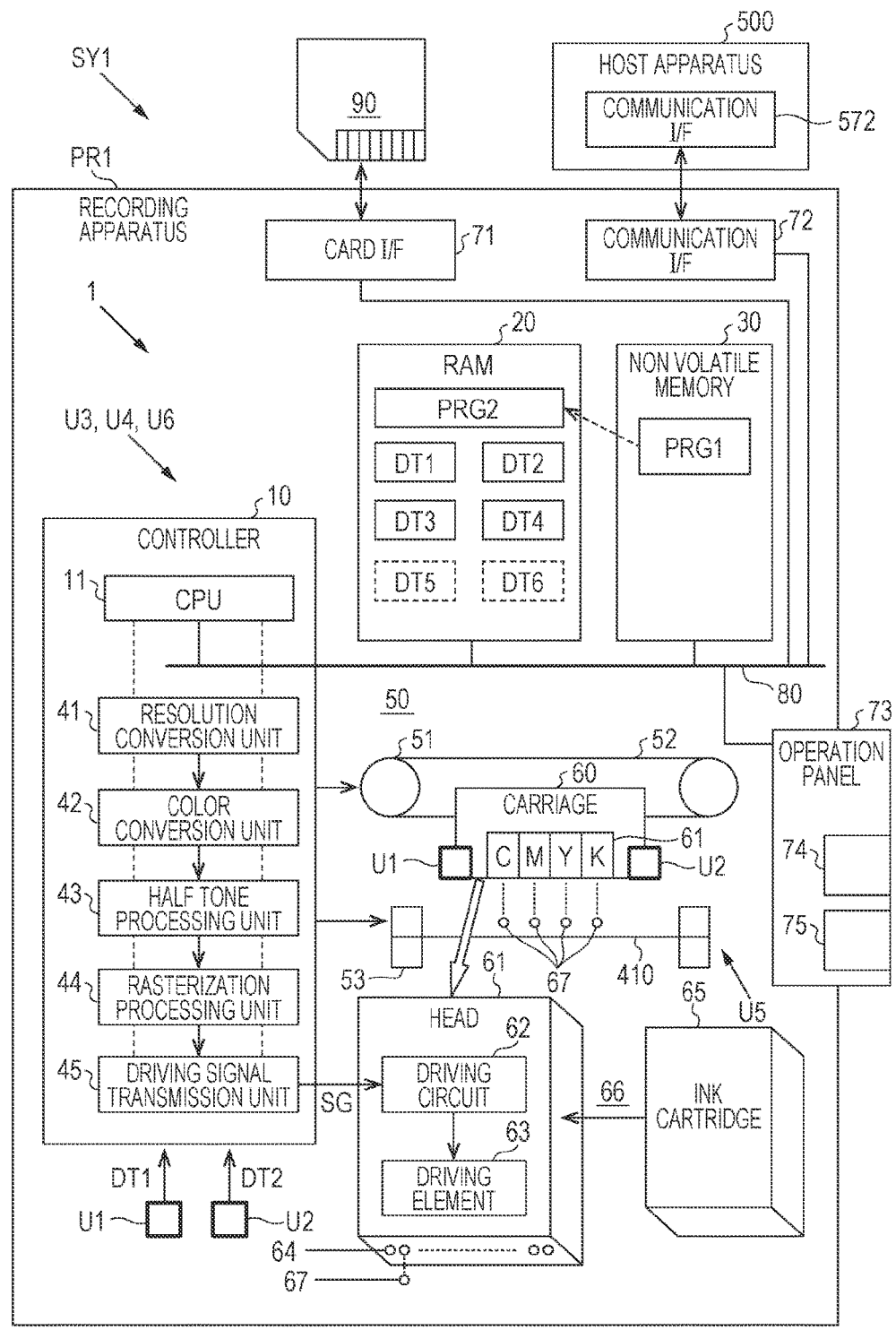
FIG. 2 is a diagram schematically illustrating a configuration example of a recording system including a color-measuring apparatus and a print control apparatus.

2. Specific Example of Configuration of Recording System Including Color-Measuring Apparatus and Print Control Apparatus FIG. 1 schematically illustrates an example of correcting the color of the printing image IM3 by obtaining the color measured result DT3 of the test pattern TP using an area sensor (imaging unit) U1 and a color-measuring sensor (reference color-measuring unit) U2. FIG. 2 schematically illustrates a configuration example of the recording system SY1 including the color-measuring apparatus and the print control apparatus 1. The recording apparatus PR1 included in the recording system SY1 is a large size ink jet printer which performs printing on roll sheet having a relatively large size having a width not being read by the scanner, for example, a printing width of an A0-sized sheet, an A1-sized sheet, or the like, of JIS standard; however, it may not be a large size printer. FIG. 2 schematically exemplifies a configuration example a serial printer which is a type of an ink jet printer as the recording apparatus PR1. Of course, an ink jet printer to which the technology can be applied may be the line printer, or the like. A recording apparatus capable of adopting the technology may be an electrophotographic printer such as the laser printer, or may be copy machines and facsimiles, and a multifunction machine having functions of these machines, and the like. Ink used in the ink jet printer which forms color images includes, for example, ink of C (cyan), M (magenta), Y (yellow), and K (black). Of course, the ink may further include Lc (light cyan), Lm (light magenta), Lk (light black), Dy (dark yellow), Or (orange), Gr (green), or the like, and may further include uncolored ink for improving image quality, or the like. Here, Lc is cyan having a concentration lower than that of C, Lm is magenta having a concentration lower than that of M, Lk is uncolored ink having a concentration lower than that of K, and Dy is yellow having a concentration higher than that of Y.

Figure 3:
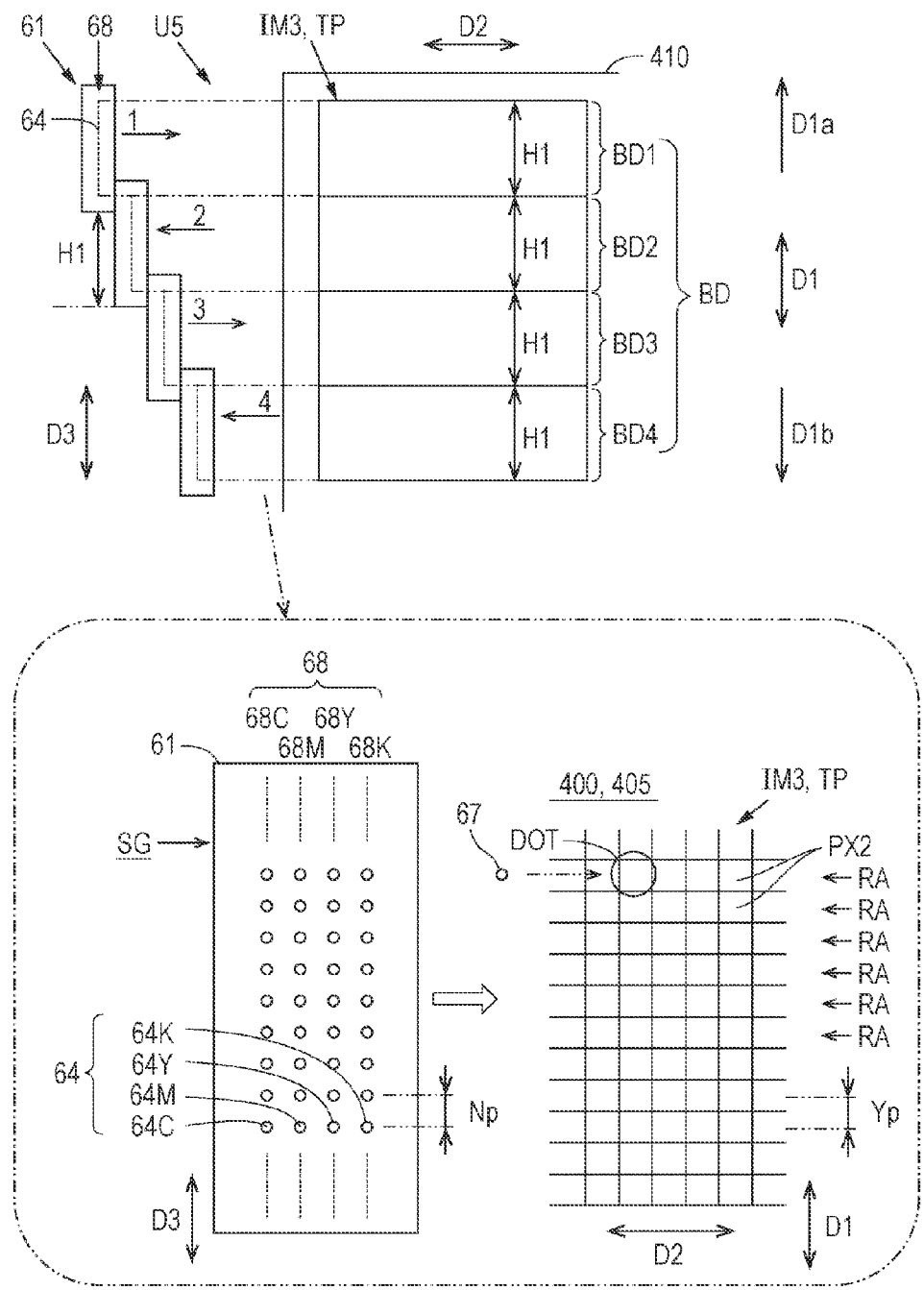
FIG. 3 is a diagram schematically illustrating an example of band printing.

FIG. 3 schematically illustrates an example of the band printing as a recording method of the recording apparatus PR1. In the band printing, all dots of one band amount corresponding to a nozzle row 68 of the recording head 61 are formed by mainly scanning the recording head 61 with respect to the printing medium 410 in one time. As described later, the technology can be also applied to a recording method other than the band printing. Moreover, a symbol D1 illustrates the transportation direction of the printing medium 410, a symbol D1a illustrates a direction where the printing medium 410 is transported in the transportation direction D1, a symbol D1b illustrates a direction opposite to the direction D1a, a symbol D2 illustrates a main scanning direction (relative moving direction) intersecting the transportation direction D1 when a surface along the printing medium 410 is a reference, and the symbol D3 illustrates an arrangement direction intersecting the main scanning direction D2 when the surface along the printing medium 410 is the reference. The symbol HP of FIG. 1 indicates a home position where a cap, or the like for preventing drying the surface of the nozzle 64 of the recording head 61 are arranged. The symbol FP of FIG. 1 illustrates full position where the recording head 61 is the farthest away from the home position HP in the main scanning direction D2.

When the printing medium 410 is moved in the direction D1a, the dots DOT are formed in order of a band BD1, a band BD2, and the like with respect to the printing medium 410. The main scanning direction D2 is a direction where the carriage (head mounting unit) 60 is reciprocated, and is orthogonal to the transportation direction D1 and the arrangement direction D3 in the example illustrated in FIG. 3; however, it may not be orthogonal to the directions D1 and D3. The arrangement direction D3 is a direction in which the nozzles 64 of the nozzle row 68 are arranged side by side, and is consistent with the transportation direction D1 in the example of FIG. 3; however, it may be deviated from the transportation direction D1, substantially 45°, or the like. Moreover, the description that the two directions are intersecting with each other means that the two directions are deviated from each other including the case where the two directions are orthogonal to each other. Since the drawings are illustrated for the sake of easy understanding, a magnification of each direction is different, and each drawing is not consistent with the others. Further, a coincidence, orthogonal, and the like of the direction, the position, and the like do not only mean a strict coincidence and orthogonal, but also includes differences, and the like which are generated during manufacturing, or the like.

In the recording apparatus PR1 illustrated in FIG. 2, a controller 10, a random access memory (RAM) 20, a non volatile memory 30, a mechanical unit 50, interfaces (I/F) 71 and 72, an operation panel 73, and the like are connected to a bus 80 and the information can be input and output to each other.

The controller 10 illustrated in FIG. 2 includes a central processing unit (CPU) 11, a resolution conversion unit 41, a color conversion unit 42, a half-tone processing unit 43, a rasterization processing unit 44, a driving signal transmission unit 45, and the like. The controller 10 can be configured to have system-on-a chip (SoC), and the like.

The CPU 11 is a device which mainly performs an information process or a control on the recording apparatus PR1.

The resolution conversion unit 41 converts a spatial resolution of the image received from a host apparatus 500 or a memory card 90 into a set spatial resolution in accordance with the printing image IM3 (refer to FIG. 1). An image to be converted is described by RGB data of which a gradation value (for example, 256 gradation of 0 to 255) of RGB (red, green, and blue) which is a component of a sRGB color system is included in each pixel.

The color conversion unit 42 color-converts the RGB data into CMYK data with reference to a color conversion table which regulates a correspondence relationship between an amount of component of the RGB and a used amount of the ink of the CMYK. The CMYK data, for example, is data of which the gradation value (for example, 256 gradation of 0 to 255) of the CMYK is included in each pixel. The correction unit U3 of the technology, for example, is provided in the color conversion unit 42.

The half-tone processing unit 43 generates half-tone data, for example, by performing a predetermined half-tone process such as a dither method, an error diffusion method, or a concentration pattern method with respect to the gradation value of each pixel constituting the CMYK data and reducing a gradation number of the gradation value. The half-tone data is a data indicating a dot forming state, and may be binary data which indicates a presence of dot forming. Also the half-tone data may be various values data of three or more gradations capable of corresponding to each dot size which is respectively different from each other such as large dots, middle dots, and small dots.

The rasterization processing unit 44 generates raster data (image data in a pass unit) by performing the rasterization process on the half-tone data to be arranged side by side in order of forming the dots by the mechanical unit 50.

The driving signal transmission unit 45 generates a driving signal SG corresponding to a voltage signal applied to a driving element 63 of the recording head 61 from the raster data and outputs to a driving circuit 62. For example, when the raster data is "large dot forming", the driving signal which ejects the ink droplets for large dots is output, and when the raster data is "small dot forming", the driving signal which ejects the ink droplets for small dots is output.

The above described each unit 41 to 45 may be configured to have application specific integrated circuits (ASIC), and may directly read data to be processed from the RAM 20 or directly write data which is processed on the RAM 20.

The mechanical unit 50 controlled by the controller 10 includes the driving unit U5, a carriage 60, and the like.

The driving unit U5 includes a carriage motor 51, a paper feeding mechanism (transportation unit) 53, and the like. The carriage motor 51 reciprocates the carriage 60 in the main scanning direction D2 through a plurality of gears (not illustrated) and a belt 52. The paper feeding mechanism 53 transports the printing medium 410 in the transportation direction D1.

In the carriage 60, for example, the recording head ejecting the ink droplets (liquid droplets) 67 of the CMYK, the area sensor U1, and the color-measuring sensor U2 are mounted.

The recording head 61 includes the driving circuit 62, the driving element 63, and the like. The driving circuit 62 applies the voltage signal to the driving element in response to the driving signal SG input from the controller 10. In the driving element 63, a piezoelectric element which applies pressure to ink (liquid) 66 inside a pressure chamber communicating with the nozzle 64, the driving element which ejects the ink droplets 67 from the nozzle 64 by generating bubbles inside the pressure chamber by heat, and the like can be used. In the pressure chamber of the recording head 61, the ink 66 is supplied from an ink cartridge (liquid cartridge) 65. Combining the ink cartridge 65 with the recording head 61, for example, is provided for each CMYK. The ink 66 inside the pressure chamber is ejected from the nozzle 64 toward the printing medium 410 by the driving element 63 as the ink droplets 67, and the dots DOT of the ink droplets 67 are formed on the printing medium 410. By relatively moving the recording head 61 and the printing medium 410, the printing image IM3 corresponding to an input image is formed on the printing medium 410.

The recording head 61 illustrated in a lower end of FIG. 3 includes a group of a nozzle row of C 68C, a nozzle row of M 68M, a nozzle row of Y 68Y, and a nozzle row of K 68K side by side in the main scanning direction D2. In each nozzle rows 68C, 68M, 68Y, and 68K, nozzles 64C, 64M, 64Y, and 64K ejecting the ink droplets 67 are arranged side by side in the arrangement direction D3. Of course, the nozzle row 68 may be a nozzle row in which the nozzles 64 are arranged in zigzag and side by side in the arrangement direction D3 in two rows, or the like. Each pixel PX2 constituting the printing image IM3 and the test pattern TP, in designing, corresponds to a position where the dots DOT are formed. Each raster RA constituting the printing image IM3 and the test pattern TP, in designing, corresponds to a unit in which the dots DOT are formed in the transportation direction D1, and includes the pixels PX2 arranged side by side in the main scanning direction D2. When the recording head 61 illustrated in FIG. 3 performs band printing, a pitch Yp of the raster RA becomes a pitch Np of the nozzle 64 included in the nozzle row 68.

When performing the band printing, by the length H1 corresponding to an amount of the printing medium 410 transported in one time in the transportation direction D1 as the unit BD, forming of the dots DOT is terminated in every unit BD. When performing a double-sided printing, the dots DOT are formed on the band BD1 corresponding to a length of the nozzle row 68 by scanning in a forward direction which is a first scanning (direction toward full position FP from home position HP illustrated in FIG. 1), the dots DOT are formed on a band BD2 by scanning of a reverse direction which is a second scanning (direction toward home position HP from full position FP illustrated in FIG. 1), the dots DOT are formed a band BD3 by scanning of a forward direction which is a third scanning, and the dots DOT are formed on a band BD4 by scanning of a reverse direction which is a fourth scanning. Accordingly, in the transportation direction D1, there is a tendency that the concentration unevenness (spot) in every the raster RA is repeated in every unit BD. Here, by including at least one of the units BD in the test patterns TP, the length H2 of the test pattern TP in the transportation direction D1 is equal to or longer than the length H1 of the unit BD.

The area sensor (imaging unit) U1 illustrated in FIG. 2 includes a plurality of imaging elements arranged side by side in the transportation direction D1 and the main scanning direction D2, an optical system, a light emitting unit emitting light on the test pattern printing medium 405, a control unit, and the like, and obtains image information of a surface by imaging the surface of the test pattern printing medium 405. In the area sensor U1, a digital camera, or the like can be used. In the imaging element, an element converting light into an electrical signal such as a charge coupled device (CCD) and a complementary metal-oxide semiconductor (CMOS) image sensor can be used. As illustrated in FIG. 1, the area sensor U1 generates the image information DT1 of the test pattern TP by imaging the test pattern TP printed on the printing medium 410. The image information DT1 is information that the pixels PX1 finer than the pixel PX 2 of the test pattern TP in both directions of the transportation direction D1 and the main scanning direction D2 are arranged in the transportation direction D1 and the main scanning direction D2. In each pixel PX1, for example, the image values (R1$i$, G1$i$, and B1$i$) of the RGB are stored. Here, a variable i is a variable which identifies each pixel included in the image information DT1. The image information DT1, for example, is transferred from the area sensor U1 to the controller 10.

The area sensor U1 cannot image the entirety of the main scanning direction D2; however, the area sensor U1 can image the wide imaging range R1 in a unit more finer than the pixel PX2 of the test pattern TP. Therefore, color (including concentration) in every pixel PX2 of the test pattern TP can be measured. This means that a difference (for example, the concentration unevenness) of color between the rasters RA of the test pattern TP can be obtained. In addition, since the wide imaging range R1 can be imaged with respect to the test pattern printing medium 405 in a non-contact state, much information can be obtained in a short time.

However, the area sensor U1 has an accuracy degree of the measurement value lower than that of the color-measuring sensor because of influences of external light, shadow, lenses, and the like.

The color-measuring sensor (reference color-measuring unit) U2 illustrated in FIG. 2 is referred to as a color-measuring device, a colorimetric device, a colorimeter, or the like, and color-measures the surface of the test pattern printing medium 405 and obtains the reference color measurement value DT2 of the surface. In the color-measuring sensor U2, for example, a spectrometer including a light emitting unit that emits light on the test pattern printing medium 405, a spectral measuring unit, a control unit, and the like can be used. The spectrometer measures a spectral characteristic of light of an inspection object by applying standard light having a predetermined spectral characteristic to the test pattern TP from the light emitting unit and making the light of the inspection object reflected by the test pattern TP incident on the spectral measuring unit. The spectral characteristic indicates intensity of the light in every wavelength. As the color-measuring sensor U2, the spectrometer having an etalon which makes the light of the inspection object be incident can be used. As illustrated in FIG. 1, the color-measuring sensor U2 color-measures the test pattern TP printed on the printing medium 410 and generates the reference color measurement value DT2 of the test pattern TP. A range of the test pattern TP in which the light of the inspection object is incident by the spectral measuring unit, that is, the measuring range R2 for obtaining the reference color measurement value DT2 by the color-measuring sensor U2, is wider than the pixel PX2 of the test pattern TP in both directions of the transportation direction D1 and the main scanning direction D2. Therefore, it is said that the measuring range R2 is wider than that of the raster RA in the transportation direction D1. Since the color-measuring sensor U2 obtains the spectral characteristic of the test pattern TP, the reference color measurement value DT2 can be illustrated, for example, as the RGB values (R0, G0, and B0) converted from the spectral characteristic or component values of L*a*b color space (L*, a*, and b*) of International Commission on Illumination (CIE). The reference color measurement value DT2, for example, reaches the controller 10 from the color-measuring sensor U2.

The color-measuring sensor U2 can perform color-measuring in only a range wider than the raster RA of the test pattern TP, and can color-measure a color (including concentration) of a pattern PA included in the test pattern TP more accurately than the area sensor U1. However, since color-measuring is performed the test pattern printing medium 405 in a state of being closer than the area sensor U1, there is a limitation of the number of patterns which can be color-measured within a limited time, much information cannot be obtained.

Here, as described later, in comparison with the measuring range R2 of the color-measuring sensor U2, at least the color measured result DT3 of the test pattern TP in a range in every narrow raster RA in the transportation direction D1 is obtained based on the image information DT1 and the reference color measurement value DT2. Specifically, when the recording apparatus is a large printer, there is a possibility that an amount of external light varies, depending on a position on the printing medium; however, the color measured result and the color measurement value can be obtained by two types of the area sensor and the color-measuring sensor with high accuracy.

In the RAM 20, program PRG2 processed by program data PRG1, the image information DT1, the reference color measurement value DT2, the color measured result DT3, the correction value DT4, and the like are stored. The program PRG2 includes a program which causes the recording apparatus PR1 to execute a correction function corresponding to the correction unit U3, an amendment function corresponding to the amending unit U4, and a test pattern printing function corresponding to the test pattern printing unit U6.

The program data PRG1, and the like are stored in the non volatile memory 30. As the non volatile memory 30, a read-only memory (ROM), a magnetic recording medium which is a hard disk, or the like is used. Moreover, a process of the program data PRG1, means writing of the data in the RAM 20 as a program which is capable of being interpreted by the CPU 11.

A card I/F 71 is a circuit which writes data in a memory card 90 or reads data from the memory card 90. The memory card 90 is a non volatile semiconductor memory which is capable of writing and removing the data, and stores the image captured by the imaging apparatus which is a digital camera is stored. The image is displayed, for example, by a pixel value of a RGB color space, and each pixel of the RGB is displayed, for example, by the gradation value of 0 to 255.

A communication I/F 72 is connected to a communication I/F 572 of a host apparatus 500 and inputs and outputs the data with respect to the host apparatus 500. As the communication I/F 72 and 572, a universal serial bus (USB), or the like can be used. In the host apparatus 500, a computer such as a personal computer, a digital camera, a digital video camera, and a mobile phone such as a smartphone, are included.

An operation panel 73 includes an output unit 74, an input unit 75, and the like, and a user can input various instructions to the recording apparatus PR1 through the panel. The output unit 74, for example, is configured to have a liquid crystal panel (display unit) displaying information relating to various instructions or information indicating a state of the recording apparatus PR1. The output unit 74 may output the information as sound. The input unit 75, for example, is configured to have an operation key (operation input unit) such as a cursor key or a determination key. The input unit 75 may be a touch panel, or the like which receives operations on a display surface.

3. Specific Examples of Configuration of Print Control Apparatus Including Color-Measuring Apparatus The print control apparatus 1 illustrated in FIGS. 1 and 2 includes the area sensor U1, the color-measuring sensor U2, the correction unit U3 including the amending unit U4, and the driving unit U5 and the test pattern printing unit U6, and is disposed in the recording apparatus PR1. Of course, at least a part of the print control apparatus 1 may be disposed in the host apparatus 500.

The test pattern printing unit U6 prints the test pattern TP on the printing medium 410 which is transported by the paper feeding mechanism 53, as illustrated in FIG. 1, by the recording head 61 mounted on the carriage 60 subjected to scan movement. The test pattern TP of the test pattern printing medium 405 includes, in every color of the CMYK, a plurality of patterns PA which have the gradation values corresponding to a recording concentration of the ink (for example, 256 gradation of 0 to 255) which are different from each other. The recording concentration means a ratio of the number of dots formed with respect to the predetermined number of the pixels PX2, and when each dot having different size is formed, means a ratio at the time of conversion in terms of the largest dot (for example, large dot). For example, when Nd large dots are formed with respect to the 100 pixels PX2, the recording concentration becomes Nd %. In FIG. 1, the test pattern TP of M having a pattern PA corresponding to each gradation value C1 to C4 which is different from the other, the test pattern TP of C having a pattern PA corresponding to each gradation value M1 to M4 which is different from the other, the test pattern TP of Y having a pattern PA corresponding to each gradation value Y1 to Y4 which is different from the other, and the test pattern TP of K having a pattern PA corresponding to each gradation value K1 to K4 which is different from the other are illustrated. The test pattern data for forming each test pattern TP is prepared in advance. As described above, at least one unit BD is included in the test pattern TP, and the length H2 of the test pattern TP in the transportation direction D1 is equal to or longer than the length H1 of the unit BD in which the formation of the dots DOT is terminated. In FIG. 1, n rasters RA including in the test pattern TP are illustrated as 1 to n raster (n is greater than 1).

The amending unit U4 (correction unit U3) allows the paper feeding mechanism 53 to control the printing medium 410 to be returned in an opposite direction D1$b$ to the direction D1$a$ where the printing medium 410 is transported so that the area sensor U1 can image the test pattern TP, and the color-measuring sensor U2 can color-measure the test pattern TP, without detaching the test pattern printing medium 405. The area sensor U1 mounted in the carriage 60 sequentially images the test pattern TP, and generates the image information DT1. The amending unit U4, for example, generates the image value DT10 based on the image information DT1 in every raster RA for every pattern PA included in the test pattern TP. FIG. 1 illustrates that the image value DT10 of each raster i is (R2$i$, G2$i$, and B2$i$). Here, the variable i is a variable which identifies each of raster RA included in the test pattern TP. In addition, the color-measuring sensor U2 mounted in the carriage 60 sequentially color-measures the test patterns TP and generates the reference color measurement value DT2. The reference color measurement value DT2, for example, is generated for every pattern PA. The amending unit U4 amends the image value DT10 in every raster RA for every pattern PA by the reference color measurement value DT2 and generates the color measured result DT3.

Figure 7:
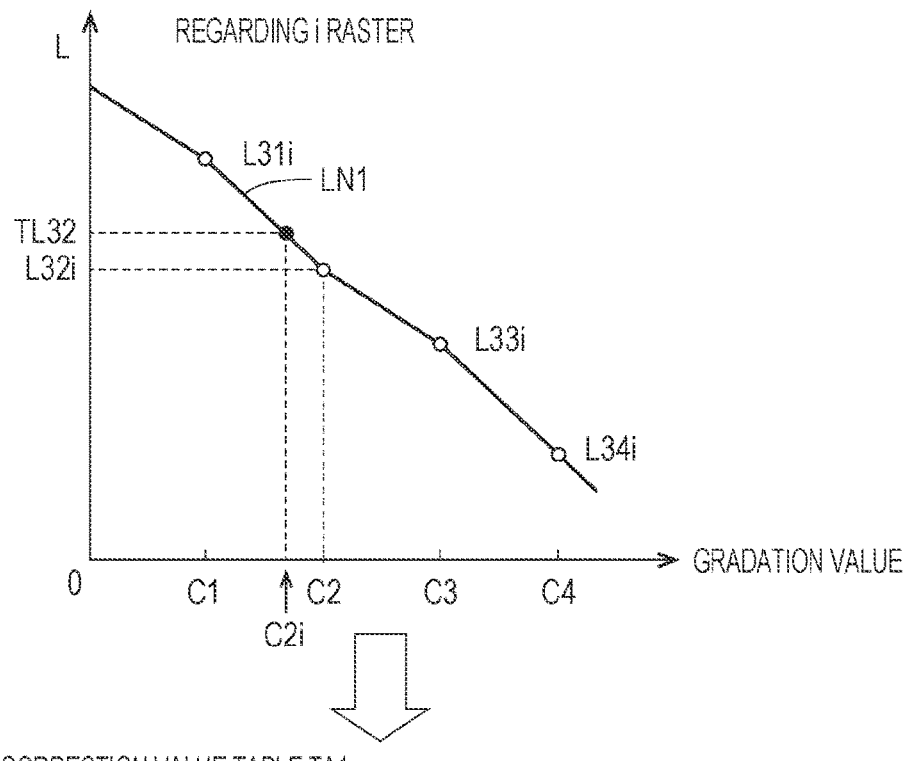
FIG. 7 is a diagram schematically illustrating an example of calculating the correction values in every raster.
Figure 8:
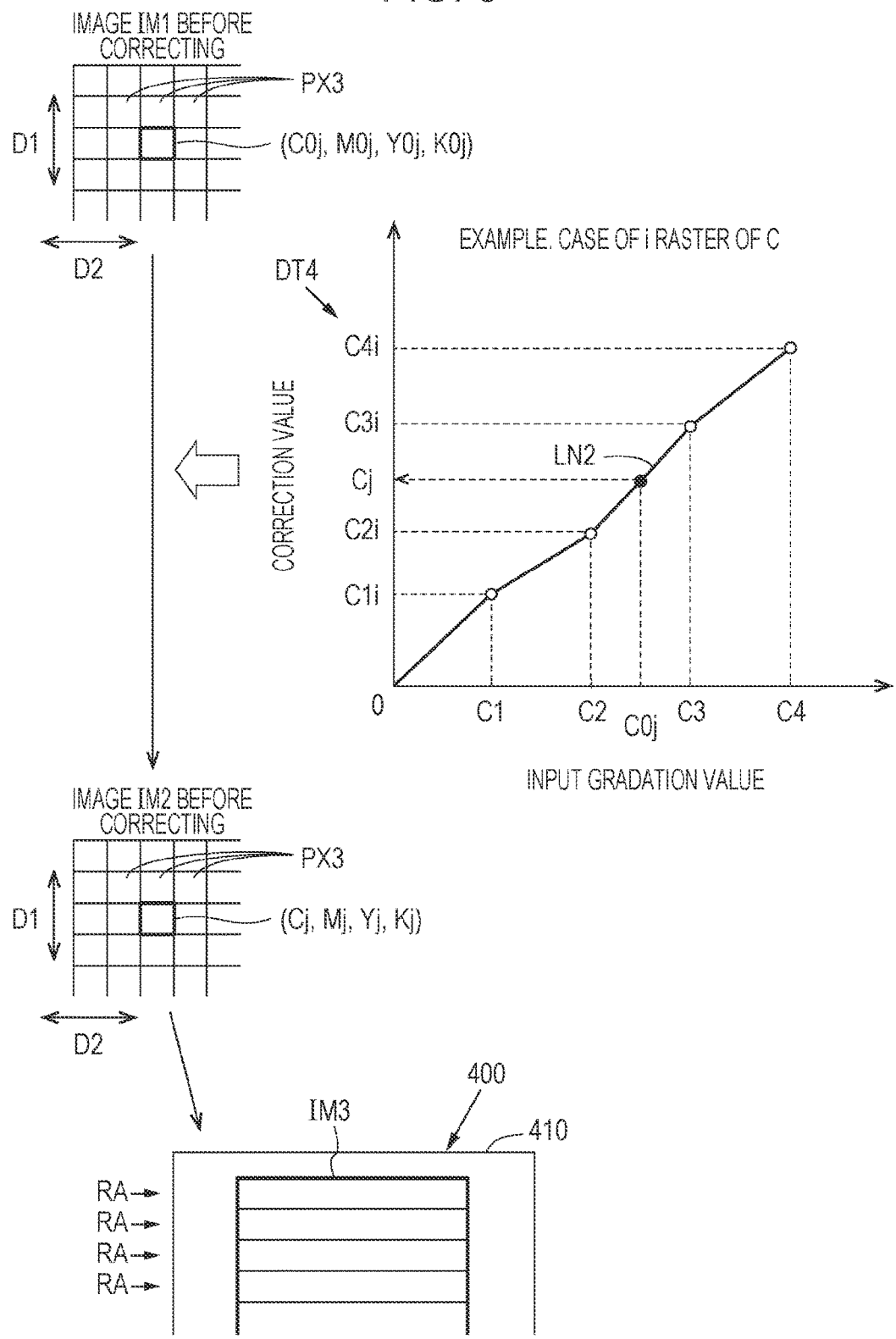
FIG. 8 is a diagram schematically illustrating an example of correcting of the printing data in every raster.

The correction unit U3 generates the correction value DT4 for correcting the color of the printing image IM3 based on the color measured result DT3. The correction values DT4 is used to correct the printing data for forming the printing image IM3 (for example, image IM1 before correcting as illustrated in FIG. 8), and for example, are prepared as the correction value table TA1 as illustrated in FIG. 7 in every color, gradation value, and raster. The correction unit U3 corrects the image IM1 before correcting illustrated in FIG. 8 with reference to the correction value DT4, and forms the printing image IM3 on the printing medium 410 according to an image IM2 after correcting. Accordingly, a print object 400 is formed in which the printing image IM3 having the corrected color in every raster RA is included in the printing medium 410.

4. Examples of Correction of Color of Printing Image

Figure 4:
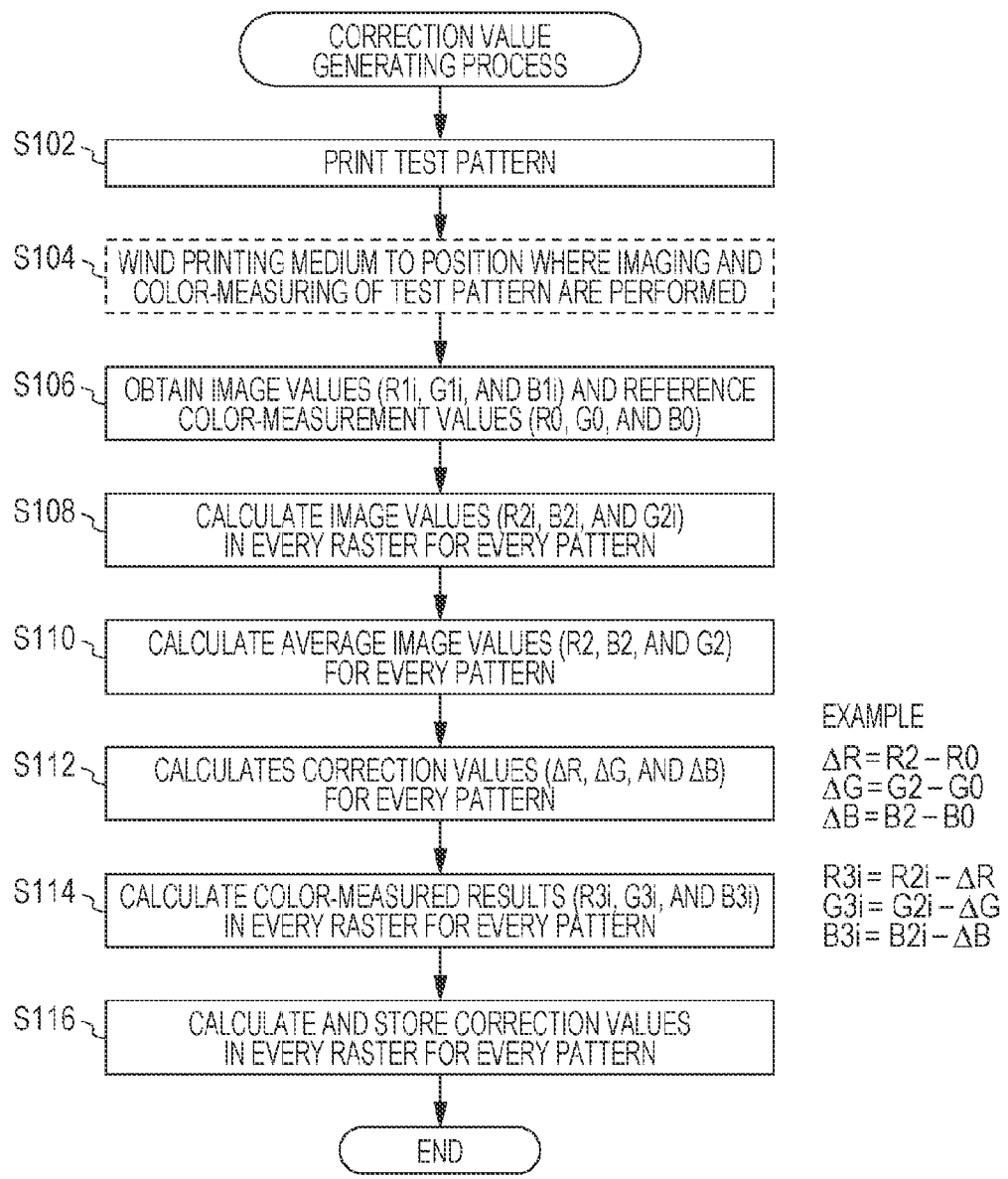
FIG. 4 is a flow chart illustrating an example of a correction value generating process performed by the print control apparatus.

Next, with reference to FIG. 4, and the like, the correction value generating process which is executed by the recording apparatus PR1 as the print control apparatus 1 will be described. This process is carried out by the controller 10 as a main device, and is started when receiving a predetermined inputting for calibration of the printing image IM3 from the operation panel 73 or the host apparatus 500. Time when performing the correction value generating process, is time when first using the recording apparatus PR1, time when a lot of the printing medium 410 is changed, time when exchanging the recording head 61, a time when moving the recording apparatus PR1 to another place under a different use circumstance, or the like. FIG. 4 illustrates the cases where the image information DT1 is the RGB values (R1$i$, G1$i$, and B1$i$), the image value DT10 being generated is the RGB values (R2$i$, G2$i$, and B2$i$), the reference color measurement value DT2 is the RGB values (R0, G0, and B0), or the color measured result DT3 being generated is the RGB values (R3$i$, G3$i$, and B3$i$). Of course, the image information DT1 or the reference color measurement value DT2, or the color measured result DT3 may be a value indicating brightness which is the brightness L converted from the RGB values, or the like. The brightness L is L* of the CIE L*a*b* color space.

Moreover, Step S102 corresponds to the test pattern printing unit U6, Steps S104 to S114 correspond to the amending unit U4, and Steps S104 to S116 correspond to the correction unit U3. Hereinafter, a description of "Steps" will be omitted.

When the correction value generating process is started, the recording apparatus PR1 transports the printing medium 410 by the paper feeding mechanism 53 so that a front end of the printing medium 410 becomes a predetermined position for printing the test pattern, and prints the test pattern TP as illustrated in FIG. 1 (S102). At this time, the recording apparatus PR1, according to the test pattern data, forms the test pattern TP of the CMYK by ejecting the ink droplets 67 on the printing medium 410 from the recording head 61 mounted in the carriage 60 subjected to scan movement.

Next, as needed, without separating the test pattern printing medium 405, the controller 10 (amending unit U4) controls the printing medium 410 to be returned by the paper feeding mechanism 53 to a position where the test pattern TP in the transportation direction D1 is imaged and is color-measured. The paper feeding mechanism 53 rewinds the printing medium 410 according to a control of the controller 10 (S104).

Further, the controller 10 causes the area sensor U1 to image the test pattern TP and obtains the image information (R1$i$, G1$i$, and B1$i$) from the area sensor U1, and causes the color-measuring sensor U2 to color-image the test pattern TP and obtains the reference color measurement values (R0, G0, and B0) from the color-measuring sensor U2 (S106). The reference color measurement values (R0, G0, and B0) are generated for every pattern, that is, with regard to the gradation values C1 to C4, M1 to M4, Y1 to Y4, and K1 to K4 respectively.

Further, as illustrated in FIG. 1, based on the image information (R1$i$, G1$i$, and B1$i$), the controller 10 calculates the image values (R2$i$, G2$i$, and B2$i$) in every raster RA in every pattern PA included in the test pattern TP (S108). The image values (R2$i$, G2$i$, and B2$i$), for example, can be a value which is an average of values (R1$i$, G1$i$, and B1$i$) of all pixels PX1 included in the raster RA for the pattern PA. An example of the average includes arithmetic mean, geometric mean, weighted mean, and the like. This applies below. When the rasters RA of an object for obtaining the color measured result are n pieces of 1 raster to n raster, the n image values (R2$i$, G2$i$, and B2$i$) for every pattern PA are generated.

Further, for every pattern PA, the controller 10 averages the image values (R2$i$, G2$i$, and B2$i$) and calculates the average image values (R2, G2, and B2) (S110). When the rasters RA of an object for obtaining the color measured result are n pieces of 1 raster to n raster, n image values (R2$i$, G2$i$, and B2$i$) are averaged. The average image values (R2, G2, and B2) are generated with regard to the gradation values C1 to C4, M1 to M4, Y1 to Y4, and K1 to K4, respectively.

Further, for every pattern PA, the controller 10 calculates the amendment values (ΔR, ΔG, and ΔB) for amending the image values (R2$i$, G2$i$, and B2$i$) by the reference color measurement values (R0, G0, and B0) (S112). The amendment values (ΔR, ΔG, and ΔB), for example, can be values obtained by subtracting the reference color measurement values (R0, G0, and B0) from the average image values (R2, G2, and B2).

$$\Delta R = R2 - R0$$

$$\Delta G = G2 - G0$$

$$\Delta B = B2 - B0$$

The amendment values (ΔR, ΔG, and ΔB) are generated with respect to the gradation values C1 to C4, M1 to M4, Y1 to Y4, and K1 to K4 respectively.

Further, for every pattern PA, the controller 10 calculates the color measured results (R3$i$, G3$i$, and B3$i$) in every raster RA based on the image values (R2$i$, G2$i$, and B2$i$) and the amendment values (ΔR, ΔG, and ΔB) in every raster RA (S114).

$$R3i = R2i - \Delta R$$

$$G3i = G2i - \Delta G$$

$$B3i = B2i - \Delta B$$

When the rasters RA of the object for obtaining the color measured result are n pieces of 1 raster to n raster, n color measured results (R3$i$, G3$i$, and B3$i$) for every pattern PA are generated.

Even when the image value DT10 being generated is a brightness (referred to as L2$i$), and the reference color measurement value DT2 is a brightness (referred to as L0), in the same manner, the color measured result (referred to as L3$i$) can be generated. That is, for every pattern PA, the average image value (referred to as L2) is calculated from the image value L2$i$, the amendment value (referred to as ΔL) is calculated by subtracting the reference color measurement value L0 from the average image value L2, and the color measured result L3$i$ is calculated by subtracting the amendment value ΔL from the image value L2$i$ in every raster RA.

In addition, instead of the brightness L, the color measured result may be calculated by one of a R value, a G value, and a B value, an average of R value, G value, and B value, a luminance of calculated from the RGB values, and the like.

Figure 5:
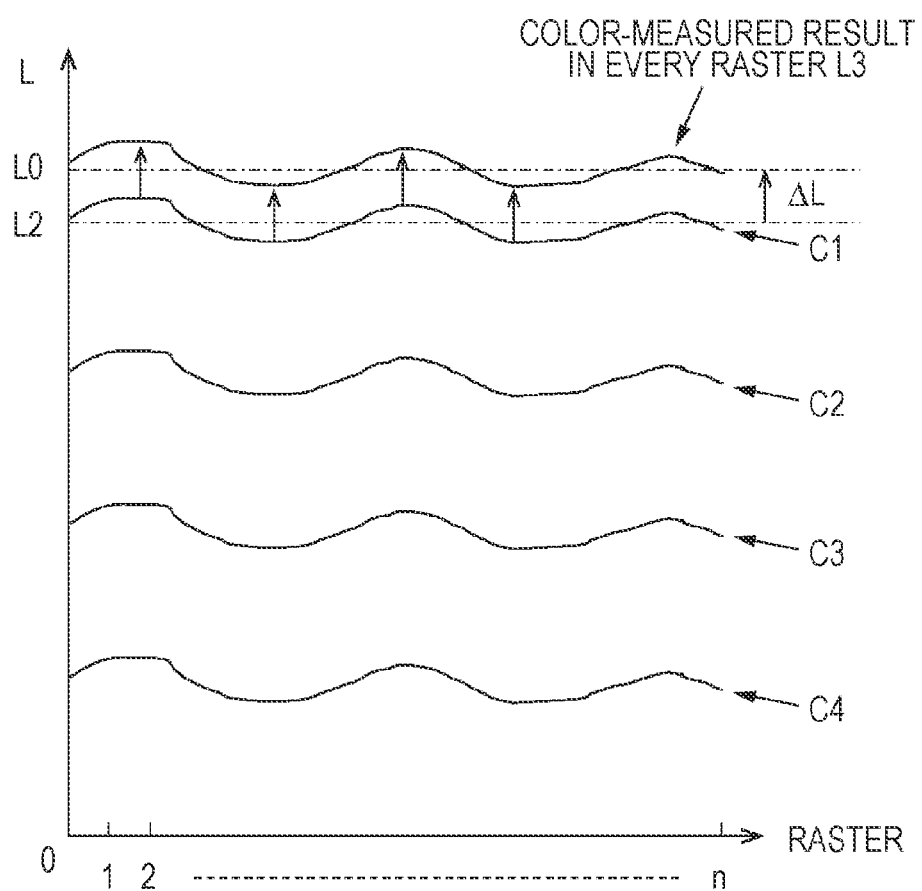
FIG. 5 is a diagram schematically illustrating an example of obtaining a color measured result in every raster.

FIG. 5 schematically illustrates an example of the color measured result DT3 obtained in every raster RA from the test pattern TP of C. In FIG. 5, a horizontal axis indicating the raster number, a vertical axis indicating the brightness L, the brightness L of 1 raster to n raster with regard to gradation values C1 to C4 are respectively illustrated. Differences of the brightness L in every raster are caused due to the fact that a characteristic of ejecting the ink droplets of the nozzle 64 respectively corresponding to 1 raster to n raster is very slightly different, or the like. In addition, in FIG. 5, the image value DT10 in every raster RA is illustrated by the brightness L, the average image value of the pattern PA of the gradation value C1 is illustrated by the brightness L2, the reference color measurement value DT2 of the pattern PA of the gradation value C1 is illustrated by the brightness L0, and the amendment value of the pattern PA of the gradation value C1 is illustrated by a brightness difference ΔL=L2−L0.

With regard to the pattern PA of the gradation value C1, since the average image value L2 is deviated from the reference color measurement value L0 as ΔL by deviating the image value L2$i$ in every raster RA by ΔL (L3$i$=L2$i$−ΔL), the color measured result L3$i$ which is more accurate in every raster RA can be obtained. In the example illustrated in FIG. 5, ΔL=L2−L0<0, and the image value L2$i$ in every raster increases as |ΔL| and the color measured result L3$i$ is generated. The color measured result L3$i$ can be obtained with regard to the pattern PA of the gradation values C2 to C4 in the same manner, and the color measured result L3$i$ can be obtained with regard to each pattern PA of the MYK in the same manner.

Figure 6A:
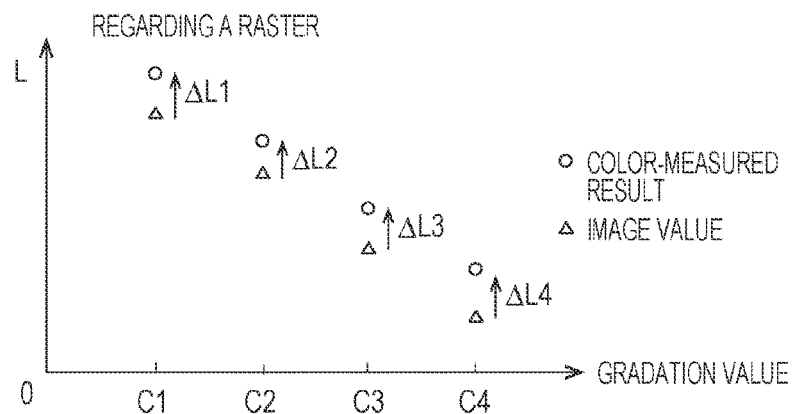
FIGS. 6A to 6C are diagrams schematically illustrating various examples of obtaining the color measured result.

FIG. 6A schematically illustrates an example obtaining the color measured result DT3 according to a raster RA with regard to the test pattern TP of C. In FIG. 6A, the horizontal axis is the gradation value, and the vertical axis is the brightness L. In the example, the reference color measurement values (referred to as L01 to L04) respectively corresponds to the gradation values C1 to C4, the amendment values ΔL1 to ΔL4 can be obtained with regard to the gradation values C1 to C4, respectively, and the color measured result can be obtained. When the imaged value in every raster respectively with regard to the gradation values C1 to C4 are L21$i$ to L24$i$, the color measured results (referred to as L31$i$ to L34$i$) can be obtained by following equations.

$$L31i = L21i - \Delta L1$$

$$L32i = L22i - \Delta L2$$

$$L33i = L23i - \Delta L3$$

$$L34i = L24i - \Delta L4$$

The color measured result can also be obtained in the same manner with regard to the pattern PA of a MYK. This applies to the example illustrated in FIGS. 6B and 6C.

Figure 6B:
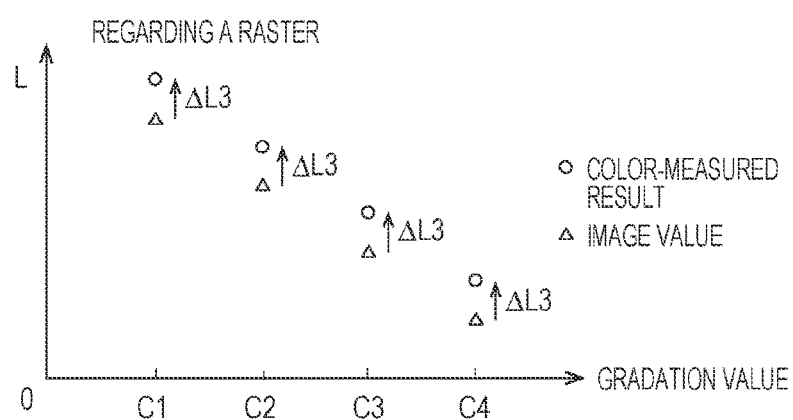

As described above, since the color-measuring sensor U2 has limit in color-measuring the number of patterns capable of color-measuring within a limited time, it is considered that a part of the pattern PA is only color-measured by the color-measuring sensor U2 for reducing the color-measuring time. For example, as illustrated in FIG. 6B, one pattern PA among a plurality of the patterns PA included in the test pattern TP (for example, pattern of gradation value C3) is only color-measured by the color-measuring sensor U2 and the reference color measurement value (for example, L03) is obtained, and thus the correction value ΔL3 with regard to the gradation value C3 is calculated and may be used with regard to all gradation values C1 to C4. In this case, the color measured results L31$i$ to L34$i$ can be calculated by a following equation.

$$L31i = L21i - \Delta L3$$

$$L32i = L22i - \Delta L3$$

$$L33i=L23i-\Delta L3$$

$$L34i=L24i-\Delta L3$$

Of course, a pattern obtaining the reference color measurement value may be a pattern of the gradation values C1, C2, and C4.

Figure 6C:
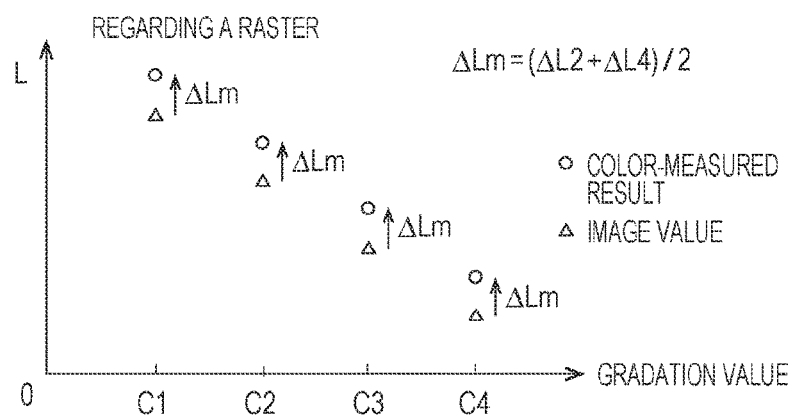

In addition, as illustrated in FIG. 6C, the patterns PA (for example, patterns of the gradation values C2 and C4), which are multiple but a part, among the plurality of the patterns PA included in the test pattern TP are only color-measured by the color-measuring sensor U2 and the reference color measurement values (for example, L02, L04) is obtained, the amendment values ΔL2 and ΔL4 are calculated and averaged with regard to the gradation value C2 and C4 so as to generate an average correction value, and the average amendment value Δm may be applied with regard to all gradation values C1 to C4. In this case, the color measured results L31i to L34i can be calculated by following equations.

$$L31i=L21i-\Delta Lm$$

$$L32i=L22i-\Delta Lm$$

$$L33i=L23i-\Delta Lm$$

$$L34i=L24i-\Delta Lm$$

Of course, the correction value for calculating the average amendment value Δm includes the amendment values ΔL1 and ΔL3 with regard to the gradation values C1 and C3.

In S114 of FIG. 4, when the color measured result DT3 in every raster for every pattern PA is obtained, the controller 10 (correction unit U3) calculates and stores the correction value DT4 in every raster RA for every pattern PA based on the color measured result DT3 (S116), and terminates the correction value generating process. The correction value DT4, for example, as the correction value table TA1 illustrated in FIG. 7, is prepared in every color, gradation value, and raster. The correction value table TA1 storing the correction value DT4, for example, is written in the non volatile memory 30, and is read by the RAM 20 and used at the time of processing the program data PRG1.

FIG. 7 schematically illustrates an example in which the correction value DT4 is calculated with regard to an i raster of the test pattern TP of C. In upper end of FIG. 7, the horizontal axis is the gradation value corresponding to a recording concentration of the pattern PA, and the vertical axis is the brightness L as the color measured result DT3, the color measured results L31i to L34i corresponding to the gradation values C1 to C4 are plotted by the white circles. In addition, a line LN1 interpolating the color measured results L31i to L34i is illustrated. The line LN1 may be a straight line or a curved line.

For example, when a target value which is anticipated from the color measured result of the pattern PA of the gradation value C2 is the brightness TL32, and the color measured result of the i raster obtained by the amending unit U4 is the brightness L32i, the gradation value C2i satisfying a correlation on the line LN1 is the correction value of the gradation value C2. That is, the correction value C2i is the gradation value obtained by interpolating the color measured results L31i to L34i when it does not consistent with the gradation value C2. The target value TL32 can be brightness obtained by color-measuring measuring the pattern PA of the gradation value C2 with, for example, a reference recording apparatus. In this case, the brightness of the printing image of the gradation value C2i formed on the printing medium 410 by the recording apparatus PR1 is the same as the brightness of the printing image of the gradation value C2 formed on the printing medium 410 by the reference recording apparatus. In the same manner, the correction value of the gradation values C1, C3, and C4 of the i raster can be obtained, the correction value of the gradation values C1 to C4 of the other raster can be obtained, and the correction value of the gradation values C1 to C4 of the MYK can be obtained. Accordingly, regarding the C, as the correction value table TA1 illustrated in FIG. 7, the correction values are respectively generated corresponding to 1 raster to n raster in each gradation value C1, C2, C3, and C4. Regarding the MYK, as well, the correction value is generated in each of 1 raster to n raster in every gradation value.

Moreover, instead of the brightness L, the correction value may be generated using any one of the R value, the G value, and the B value, an average of R value, G value, and B value, luminance converted from the RGB values, and the like.

FIG. 8 schematically illustrates an example in which the printing data (image IM1 before correcting) for forming the printing image IM3 is corrected by the correction value DT4. When the gradation value (for example, 256 gradation of 0 to 255) the CMYK indicating a use amount of ink is corrected by the correction value DT4, the CMYK data before half-tone processing which is the CMYK data generated by the color conversion unit 42 illustrated in FIG. 2 may be corrected as the image IM1 before correcting. In this case, the image IM1 before correcting becomes data in which the pixel values (C0j, M0j, Y0j, and K0j) of the CMKY are stored in the pixel PX3 arranged side by side in the transportation direction D1 and the main scanning direction D2 when being printed. Here, variable j is a variable identifying each pixel included in the image IM1.

Regarding the i raster in the unit BD illustrated in FIG. 3 in the C, the correction value DT4 illustrated in FIG. 8 indicates the correlation of the gradation value before and after correcting. Here, the correction values C1i to C4i corresponding to input gradation values C1 to C4 before correcting are plotted by the white circle. In addition, a line LN2 interpolating the correction values C1i to C4i is illustrated. The line LN2 may be a straight line or a curved line.

For example, regarding the i raster of the C, when the pixel value of the image IM1 before correcting is the C0j, the correction value Cj satisfying the correlation on the line LN2 is a pixel value of the image IM2 after correcting. When not coinciding with any one of the correction values C1i to C4i, the correction value Cj is the gradation value obtained by interpolating the correction values C1i to C4i. In the same manner, regarding the i raster of the YMK, the pixel values Mj, Yj, and Kj of the image after correcting can be obtained by correcting the pixel values M0j, Y0j, and K0j of the image IM1 before correcting. In the same manner, the pixel values Cj, Mj, Yj, and Kj of the other raster can be obtained. The obtained image IM2 after correcting becomes data in which the pixel values (Cj, Mj, Yj, and Kj) of the CMYK are stored on the pixels PX3 arranged side by side in the transportation direction D1 and the main scanning direction D2 at the time of printing. Here, the variable j is a variable identifying each pixel included in the image IM1.

Figure 9:
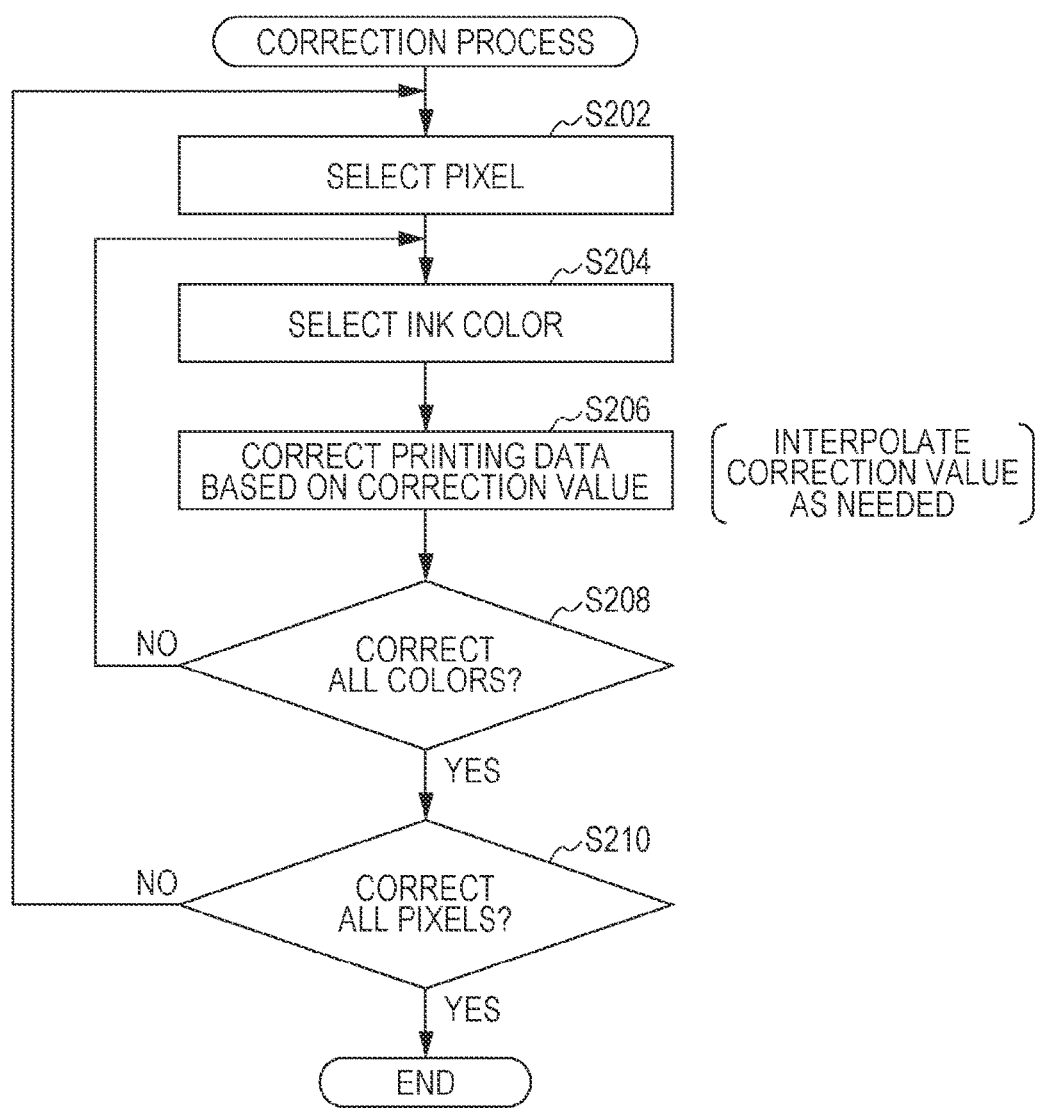
FIG. 9 is a flow chart illustrating an example of a correction process.

The FIG. 9 illustrates an example of a correcting process performed by the controller 10 (correction unit U4). The process is started when the color conversion unit 42 generates the image IM1 including the pixel values (C0j, M0j, Y0j, and K0j) in the pixel PX1 in FIG. 2. First, the controller 10 selects the pixel j which is a correcting target in the image IM1 (S202). In S204, the pixel values of the ink color of the correcting target are selected from the pixel values (C0j, M0j, Y0j, and K0j) of the pixel j which is the correcting target. In S206, with reference to the correction value table TA1 of the selected ink color, the pixel values (printing data) of the pixel j are corrected. When the ink color which is the correcting target is the C, the controller 10, with reference to the correction value table TA1 of the C, obtains the correction value Cj corresponding to the pixel value C0j as the pixel value after correcting. When the correction value Cj corresponding to the pixel value C0j is stored in the correction value table TA1, the correction value Cj is the pixel value after correcting. When the correction value Cj corresponding to the pixel value C0j is stored in the correction value table TA1, the correction value is the pixel value after correcting by interpolating the correction value Cj using the correction value corresponding to the input gradation value close to the pixel value C0j.

In S208, regarding all colors of the CMYK, it is determined whether or not the pixel value of the pixel j is corrected. When the pixel value of the ink color is not corrected, processes from S204 to S208 are repeatedly performed. When the pixel value of the pixel j is corrected with regard to all colors of the CMYK, the controller 10 determines whether or not the pixel values (C0j, M0j, Y0j, and K0j) of all pixels of the image IM1 are corrected (S210). When there is the pixel which is not corrected, the processes from S202 to S210 are repeatedly performed. When the pixel values of all pixels of the image IM1 are corrected, the controller 10 terminates the correcting process. Since the pixel values (C0j, M0j, Y0j, and K0j) of the image IM1 are corrected with regard to each CMYK respectively, a color of the final printing image IM3 is corrected.

When the image IM2 after correcting is obtained, as illustrated in FIG. 2, the half-tone processing unit 43 performs a predetermined half-tone process with respect to the gradation value of each pixel PX3 of the image IM2 so as to reduce the number of the gradation values and generates the half-tone data of each CMYK. The rasterization processing unit 44 rasterizes each pixel of the half-tone data to be arranged again by the mechanical unit 50 in order of a formation of dots, and generates the raster data of each CMYK. The driving signal transmission unit 45 generates the driving signal SG corresponding to the raster data and outputs the generated signal to the driving circuit 62 of the recording head 61, and ejects the ink droplets 67 from the nozzle 64 by driving the driving element 63 in accordance with the raster data. Accordingly, the dots DOT of the ink droplets 67 are formed on the printing medium 410, and the print object 400 on which the printing image IM3 is formed is obtained. The color of the printing image IM3 is corrected with regard to the narrow raster RA, in comparison with to the measuring range R2 of the color-measuring sensor U2 in the transportation direction D1.

When the color measured result DT3 of the test pattern TP in the range of the narrow raster RA in the transportation direction D1 comparing to the measuring range R2 of the color-measuring sensor U2 is calculated for correcting the color of the printing image IM3, the color measured result DT3 cannot be obtained by only the color-measuring sensor U2. In this specific example, the color measured result DT3 of each pattern TP in the range of the raster RA is obtained based on the image information DT1 from the area sensor U1 and the reference color measurement value DT2 from the color-measuring sensor U2, and the color of the printing image IM3 in every raster RA is corrected. Accordingly, in the specific example, a color correction in every raster RA of the printing image IM3 is accurately performed. Specifically, an effect in which a quality of the printing image is improved is also obtained with respect to a printer performing printing on a large size printing medium to which the scanner cannot be used, and thus an effect in which a calibration work is reduced and the efficiency is improved by automatically performing a calibration is also obtained. In addition, an effect in which requiring service support is reduced is also obtained in that a user can perform the calibration by himself, and effects of taking an action against the aging deterioration of the printer or facilitating the action during exchanging of the recording head are also obtained.

5. Modification Example

The invention is considered to have various modification examples.

For example, the recording apparatus PR1 may perform a pseudo-band printing, an interlaced printing, or the like, other than a band printing illustrated in FIG. 3.

When the host apparatus 500 generates the raster data from the RGB data and transmits the data to the recording apparatus PR1, the host apparatus 500 may include the correction unit U3 including the amending unit U4 and a part of the test pattern printing unit U6. The host apparatus 500 can obtain the color measured result DT3 by receiving the image information DT1 and the reference color measurement value DT2 from the recording apparatus PR1 and based on the image information DT1 and the reference color measurement value DT2, can generate the correction value DT4, and can correct the color of the printing image IM3 in every raster RA. When the host apparatus 500 generates the half-tone data from the RGB data and transmits the generated data to the recording apparatus PR1, or even when the host apparatus 500 transmits the CMYK data before the half-tone processing by color-converting the RGB data to the recording apparatus PR1, the color of the printing image IM3 in every raster RA can be corrected in the same manner.

The printing data of the correction target may also be the RGB data before color-conversion, or the like, in addition to the CMYK data after the color conversion. When the printing data of the correction target is the RGB data, the correction value may be prepared with regard to each RGB.

The above described process can be appropriately changed by changing an order thereof, or the like. For example, in the correction value generating process of FIG. 4, before a process of S108 in which the image values (R2i, G2i, and B2i) in every raster RA are calculated, a process (corresponding to S110) in which the average image values (R2, G2, and B2) of all rasters RA of the pattern PA are calculated may be performed. In addition, in FIG. 9, before a process of S202 in which the pixel j is selected, a process of S204 in which the color of ink is selected may be performed.

Each pattern PA included in the test pattern TP may be formed at a distance from the main scanning direction D2.

The test pattern having the same ink color may be formed in multiple times on the printing medium 410 in the main scanning direction D2, and may be formed on the printing medium 410 in multiple times in the transportation direction D1. In this case, the correction value may be generated by averaging the color measured result obtained from each test pattern of the same ink color.

Moreover, when the recording apparatus is a large printer having a wide width, there is a possibility that an amount of external light varies by a position on the printing medium in the main scanning direction. In this case, the test pattern TP of the same ink color is formed in multiple times on the printing medium 410 in the main scanning direction D2, and the color measured result DT3 and the correction value DT4 are generated corresponding to a position in the main scanning direction D2. Accordingly, the color measured result and the color measurement value with high accuracy can be obtained, and the correction of color with respect to the printing image with high accuracy can be performed.

Figure 10:
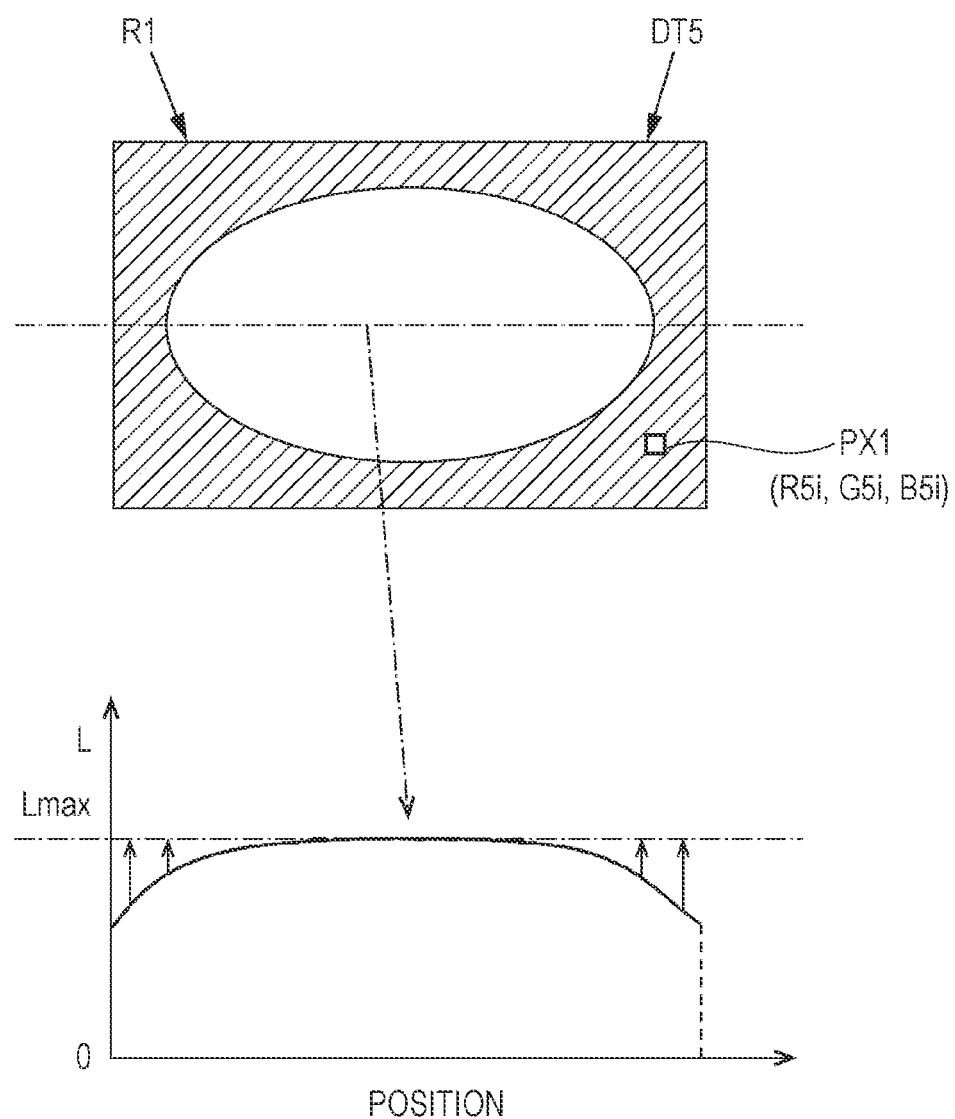
FIG. 10 is an exemplified diagram schematically illustrating a difference within an imaging range of an area sensor.

However, as illustrated in FIG. 10, the image information obtained by the area sensor includes a brightness difference by a position within the imaging range R1. In the upper end of FIG. 10, the printing medium image information DT5 obtained by imaging a base portion NP (referring to FIG. 11) where the test pattern TP is not printed in the printing medium 410 is schematically illustrated. In the printing medium image information DT5, information in which peripheries in the imaging range R1 are darker than inner parts is included. In the lower end of FIG. 10, an example of the brightness L of the printing medium image information DT5 is schematically illustrated by a position with a dashed line illustrated in the upper end of FIG. 10. Since the brightness of the peripheries in the imaging range R1 is lower than the brightness of the inner parts, the image information DT1 obtained by the area sensor U1 includes the difference of the brightness by a position in the imaging range R1. Here, the color of the printing image IM3 can be corrected based on the printing medium image information DT5 such that the difference of the brightness L by the position in the imaging range R1 is reduced.

Figure 12:
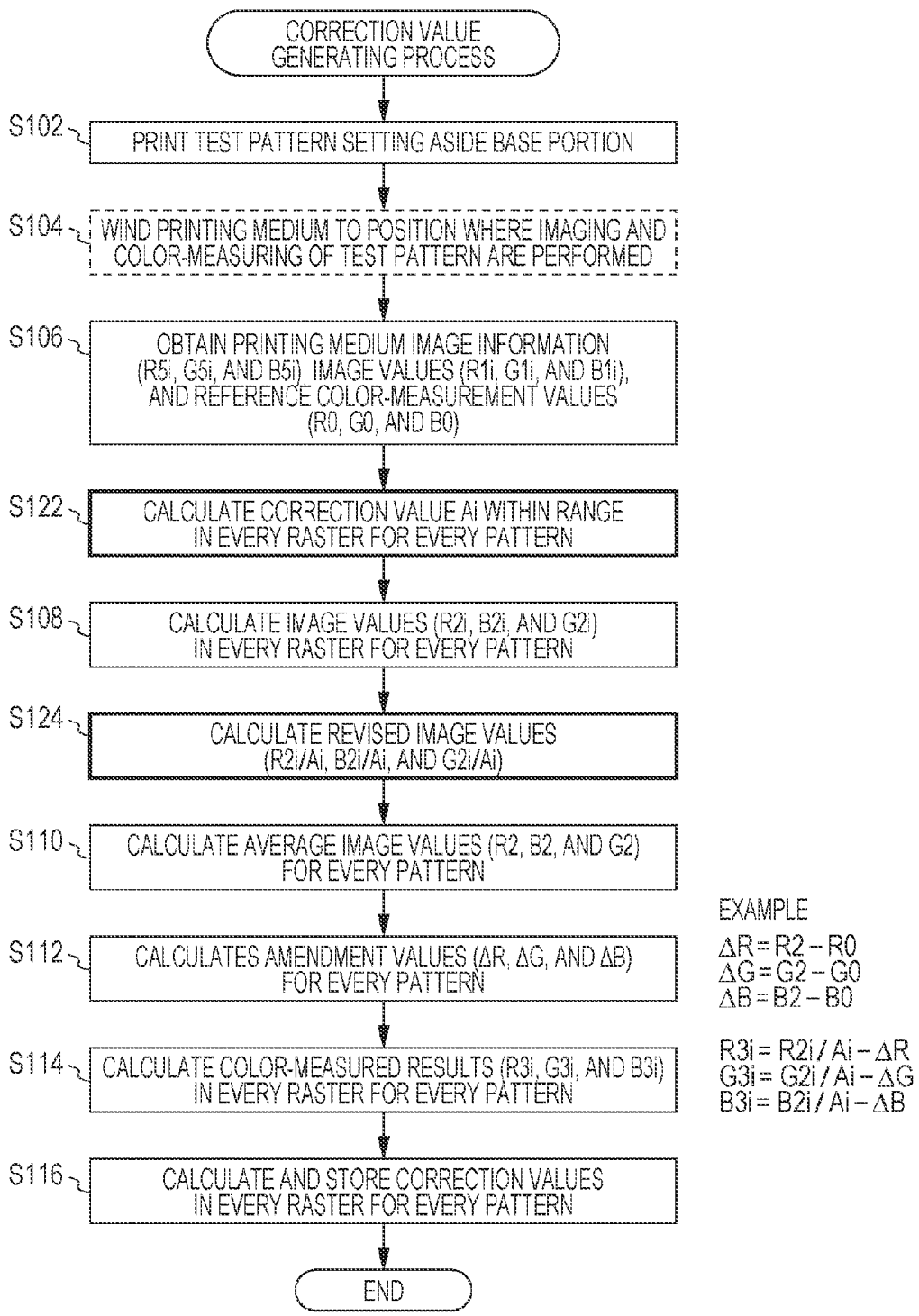
FIG. 12 is a flow chart illustrating an example of a correction value generating process which corrects the difference within the imaging range of the area sensor.

FIG. 11 schematically illustrates an example in which the difference in the imaging range R1 of the area sensor U1 is also corrected. FIG. 12 illustrated an example of the correction value generating process in which a difference in the imaging range R1 of the area sensor U1 is also corrected. In this process, processes of S122 and S124 are added comparing to the correction value generating process illustrated in FIG. 4.

The test pattern printing unit U6 of the specific example, in S102, prints the test pattern TP setting aside the base portion NP in which the test pattern TP is not printed. Next, as needed, the recording apparatus PR1 returns the printing medium 410 to a position where imaging and color-measuring of the test pattern TP in the transportation direction D1 are performed (S104). In S106, the area sensor U1 mounted in the carriage 60 obtains the printing medium image information DT5 which is the image information of the base portion NP by imaging the base portion NP, sequentially images the test pattern TP, and obtains the image information DT1 of the test pattern TP. In addition, in S106, the color-measuring sensor U2 mounted in the carriage 60 sequentially color-measures the test pattern TP and generates the reference color measurement value DT2.

In each pixel PX1 of the printing medium image information DT5, for example, the image values (R5$i$, G5$i$, and B5$i$) of the RGB are stored. Here, the variable i is a variable which identifies each pixel included in the printing medium image information DT5. The printing medium image information DT5, is transmitted, for example, from the area sensor U1 to the controller 10.

Further, based on the printing medium image information DT5, the controller 10 (amending unit U4) calculates the correction value DT6 within a range in every raster RA for every pattern PA included in the test pattern TP (S122). For example, the highest brightness in the brightness when the image values (R5$i$, G5$i$, and B5$i$) of the pixel PX1 of the printing medium image information DT5 is converted in terms of the brightness is referred to as Lmax. The controller 10, for example, based on the printing medium image information DT5, generates the brightness (referred to as L5$i$) in every raster RA for every pattern PA. With respect to the brightness Lmax, a ratio of L5$i$/Lmax of the brightness L5$i$ in every raster RA is the correction value Ai within a range illustrated in FIG. 11. Here, the variable is a variable i identifying each n raster RA included in the test pattern TP. Moreover, the correction value DT6 within the range may be a ratio of the brightness L5$i$ with respect to an average of the brightness L5$i$, a ratio of the brightness L5$i$ with respect to the brightness 100, and the like.

In S108, based on the image information (R1$i$, G1$i$, and B1$i$), the controller 10 calculates the image values (R2$i$, G2$i$, and B2$i$) in every raster RA for every pattern PA included in the test pattern TP. In S124, revised image values (R2$i$/Ai, G2$i$/Ai, and B2$i$/Ai) in every raster RA in which the image values (R2$i$, G2$i$, and B2$i$) in every raster RA are revised by the correction value Ai within the range in every raster RA are calculated. In S110, for every pattern PA, the revised image values (R2$i$/Ai, G2$i$/Ai, and B2$i$/Ai) are averaged, and the average image values (R2, G2, and B2) are calculated. In S112, for every pattern PA, the amendment values ($\Delta$R, $\Delta$G, and $\Delta$B) for amending the revised image values (R2$i$/Ai, G2$i$/Ai, and B2$i$/Ai) by the reference color measurement values (R0, G0, and B0) are calculated. The amendment values ($\Delta$R, $\Delta$G, and $\Delta$B) can be a value, for example, obtained by subtracting the reference color measurement values (R0, G0, and B0) from the average image values (R2, G2, and B2) from the revised image values (R2$i$/Ai, G2$i$/Ai, and B2$i$/Ai).

$$\Delta R = R2 - R0$$

$$\Delta G = G2 - G0$$

$$\Delta B = B2 - B0$$

In S114, based on the revised image values (R2$i$/Ai, G2$i$/Ai, and B2$i$/Ai) and the amendment values ($\Delta$R, $\Delta$G, and $\Delta$B) in every raster RA, the color measured results (R3$i$, G3$i$, and B3$i$) in every raster RA are calculated.

$$R3i = R2i/Ai - \Delta R$$

$$G3i = G2i/Ai - \Delta G$$

$$B3i = B2i/Ai - \Delta B$$

Of course, even when the generated image value DT10 is the brightness L2$i$, and the reference color measurement value DT2 is the brightness L0, the color measured result L3$i$ can be generated in the same manner.

The controller 10 (correction unit U3), based on the color measured result DT3, calculates the correction value DT4 in every raster RA for every pattern PA, stores the resultant (S116), and terminates the correction value generating process.

When the correction value DT4 is used to perform the correction process illustrated in FIG. 9, the pixel values (C0$j$, M0$j$, Y0$j$, and K0$j$) of the image IM1 illustrated in FIG. 8 are corrected with regard to the each CMYK, the color of the final printing image IM3 is corrected with regard to each raster RA. In the specific example, since the color of the printing image IM3 is corrected so that a difference of the brightness L by a position within the imaging range R1 decreases, the correction of color within the range of the narrow raster RA with respect to the printing image can be further accurately performed.

Moreover, the captured image may be corrected of aberration of distortion.

However, as the bands BD1 to BD4 illustrated in FIG. 8, when the unit BD in which a formation of the dots DOT with respect to the printing medium 410 in the transportation direction D1 is terminated is long, it is assumed that the length H1 of the unit BD in the transportation direction D1 is longer than that of the imaging range R1. In this case, at least, the transportation positions of the printing medium 410 are different from each other, and the color of the printing image IM3 may be corrected based on the plurality of the image information DT1 obtained by imaging the test pattern TP and the reference color measurement value DT2.

FIG. 13 schematically illustrates an example in which the test pattern TP is divided and imaged. The length H2 in the transportation direction D1 of the test pattern TP illustrated in FIG. 13 is longer than the length H1 of the unit BD. In an example of FIG. 13, with respect to the test pattern TP of C, sequentially, the area sensor U1 captures the imaging range including an upper half part or more of the pattern PA of the gradation values C1 and C2 so as to obtain the first image information DT11, captures the imaging range including an upper half part or more of the pattern PA of the gradation values C3 and C4 so as to obtain the first image information DT11, captures the imaging range including an lower half part or more of the pattern PA of the gradation values C1 and C2 so as to obtain the second image information DT12, and captures the imaging range including an lower half part or more of the pattern PA of the gradation values C3 and C4 so as to obtain the second image information DT12. Here, the image information DT1 of all rasters RA of the test pattern TP is obtained by matching the first image information DT11 and the second image information DT12. The color measured result DT3 and the correction value DT4 in every raster RA for every pattern PA can be generated according to the correction value generating process illustrated in FIGS. 4 and 12. The color of the printing image IM3 in every raster RA can be corrected.

In addition, the transportation positions of the printing medium 410 are caused to be different from each other and parts of the imaging range R1 is caused to be overlapped, and then information with which the imaging range overlaps between the first image information DT11 and the second image information DT12, which are obtained by imaging the test pattern TP may be averaged. In this averaging manner, there is a manner in which the first image value DT110 and the second image value DT120 illustrated in FIG. 14 are averaged.

Figure 14:
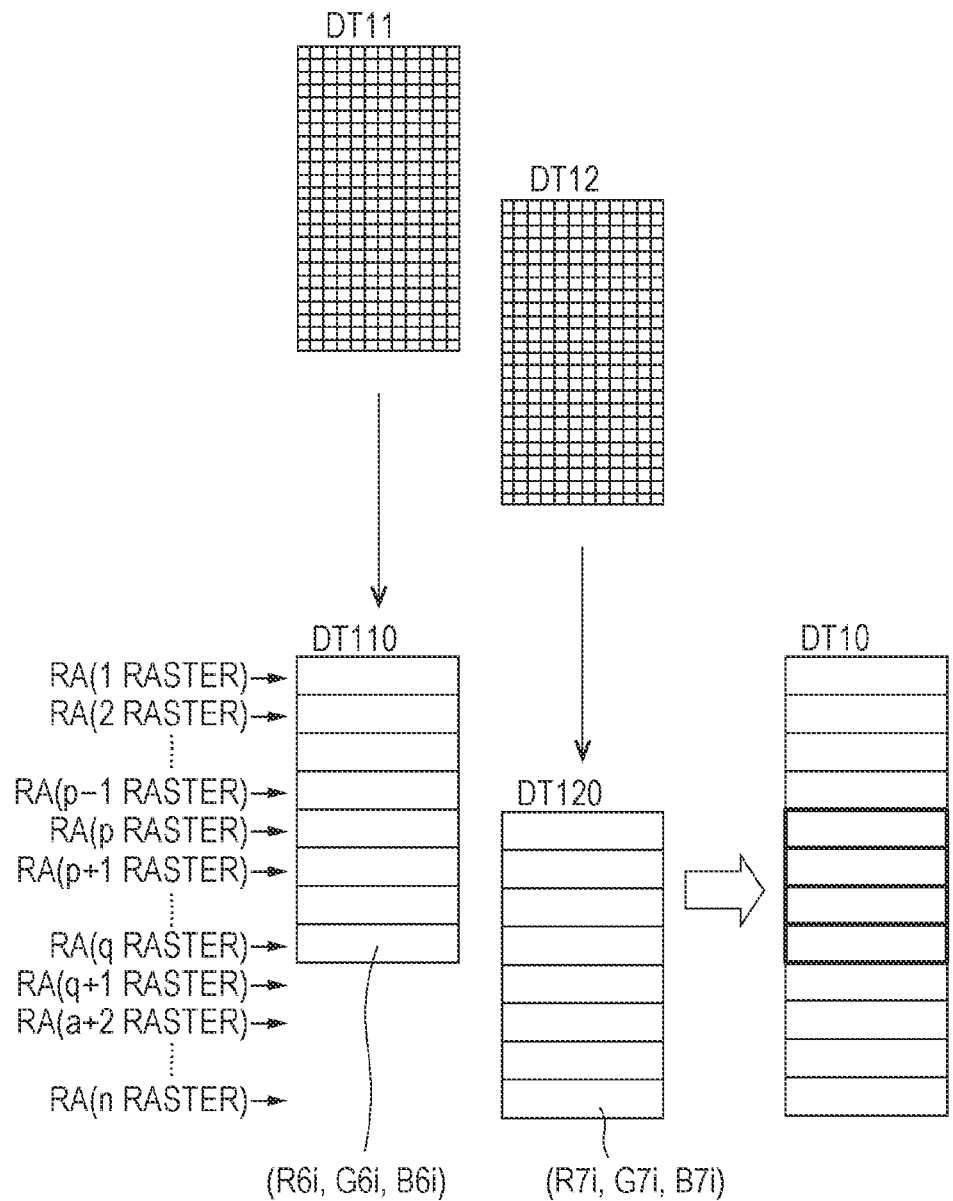
FIG. 14 is a diagram schematically illustrating an example of the image values in every raster from a plurality of image information.

FIG. 14 schematically illustrates an example in which the image value DT10 is obtained from a plurality of the image information (first image information DT11 and second image information DT12). In the example illustrated in FIG. 14, the 1 raster to q raster (3<q<n) are included in the imaging range of the first image information DT11, and the p raster to n raster (2<p<q) are included in the imaging range of the second image information DT12, such that the p raster to q raster overlap with each other. The amending unit U4 generates the first image value DT110 with regard to 1 raster to q raster based on the first image information DT11. FIG. 14 illustrates that the first image value DT110 of each raster i is (R6$i$, G6$i$, and B6$i$). In addition, the amending unit U4 generates the second image value DT120 with regard to each p raster to n raster based on the second image information DT12. FIG. 14 illustrates that the second image value DT120 of each raster i is (R7$i$, G7$i$, and B7$i$).

Regarding the 1 raster to p−1 raster, since only the first image value DT110 has a value, values (R6$i$, G6$i$, and B6$i$) of the first image value DT110 become the image value DT10 as it is. Regarding the q+1 raster to n raster, since only the second image value DT120 has a value, values (R7$i$, G7$i$, and B7$i$) of the second image value DT120 become the image value DT10 as it is. Regarding the p raster to q raster, since both of the first image value DT110 and the second image value DT120 have values, a value obtained by averaging the first image value DT110 and the second image value DT120 becomes the image value DT10. The image value DT10 of the p raster to q raster, for example, can be ((R6$i$+R7$i$)/2, (G6$i$+G7$i$)/2, (B6$i$+B7$i$)/2).

In the specific example, since the information of the length H1 or more of the unit BD can be obtained even when the test pattern TP in the transportation direction D1 is long, the correction of color within the range of the narrow raster RA with respect to the printing image IM3 can be further appropriately performed.

Moreover, if the imaging unit, the reference color-measuring unit, and the correction unit are included in the print control apparatus, a basic effect of the invention is obtained even when a function of correcting the difference of the brightness by the position within the imaging range, a function of winding to be returned the printing medium, a function of imaging the test pattern by making different the transportation positions of the printing medium from each other, or the like does not exist. In addition, even when at least one of the imaging unit and the reference color-measuring unit is not mounted in the head mounting unit, the basic effect of the invention is obtained.

Further, if the imaging unit, the reference color-measuring unit, and the amending unit are in the color-measuring apparatus, the basic effect of the invention is obtained even when a function of correcting the difference of the brightness by the position within the imaging range, a function of moving the test pattern to be returned, a function of imaging the test pattern by making the transportation positions different from each other, or the like does not exist.

6. Conclusion

As described above, according to the invention by various aspects, a technology in which color-measuring of the narrow range of the test pattern is accurately performed can be provided. Of course, the above described actions and effects are obtained by a technology of only configuration conditions according to independent Claims without configuration conditions according to dependent Claims.

In addition, a configuration in which each configuration disclosed in above described embodiments and modification examples is changed by conversion or in combination manner, and a configuration in which each configuration disclosed in a well-known technology and the above described embodiments and the modification examples is changed by conversion or in combination manner, or the like can be used. The invention includes these configurations, or the like.

What is claimed is:

1. A print control apparatus comprising:
    an area sensor that images a plurality of second pixels of a test pattern in an imaging range of the area sensor and generates image information of the test pattern as a plurality of first pixels with the first pixels being finer than the second pixels, the test pattern being printed on a printing medium;
    a reference color-measuring sensor that color-measures intensity of a reflected light in multiple wavelengths from the test pattern in a color-measuring range of the reference color-measuring sensor and obtains a reference color measurement value of the test pattern based on the intensity, the reference color-measuring sensor being more accurate than the area sensor in measuring concentration of a color of the test pattern, the color-measuring range overlapping with the imaging range; and a controller that generates a correction value based on the image information and the reference color measurement value, and corrects a color of printing data of a printing image based on the correction value to form the printing image on the printing medium according to the printing data corrected based on the correction value.

2. The print control apparatus according to claim 1, further comprising:

a carriage that relatively moves the area sensor and the reference color-measuring sensor against the printing medium, wherein the test pattern relatively moved in the imaging range is imaged by the area sensor, and wherein the test pattern relatively moved in the imaging range is color-measured by the reference color-measuring sensor.

3. The print control apparatus according to claim 2, wherein the carriage includes a recording head forming the printing image on the printing medium is mounted, and wherein the area sensor and the reference color-measuring sensor are mounted in the carriage.

4. The print control apparatus according to claim 3, wherein a range for correcting a color of the printing image becomes a unit of a raster along the relative moving direction of the carriage and the printing medium.

5. The print control apparatus according to claim 3, further comprising:

a conveyor which conveys the printing medium in a predetermined transportation direction, the carriage being moved to scan in a relative moving direction different from the transportation direction, wherein a length of the test pattern in the transportation direction is equal to or longer than that of a unit in which a formation of dots on the printing medium in the transportation direction is terminated, and wherein when the length of the unit in the transportation direction is longer than the length of the imaging range, the controller corrects the color of the printing image based on a plurality of the image information and the reference color measurement values obtained, at least, by making transportation positions of the printing medium be different from each other and imaging the test pattern.

6. The print control apparatus according to claim 3, further comprising:

a conveyor which conveys the printing medium in a predetermined transportation direction, the carriage being moved to scan in the relative moving direction different from the transportation direction, and wherein the controller corrects the color of the printing data based on, out of first image information and second image information obtained by making the transportation positions of the printing medium different from each other so as to make parts of the imaging range overlap with each other and imaging the test pattern, the first image information and the second image information in which pieces of information having the overlapped ranges are averaged and the reference color measurement value.

7. The print control apparatus according to claim 3, further comprising:

a conveyor which conveys the printing medium in a predetermined transportation direction, the carriage being moved to scan in the relative moving direction different from the transportation direction, the recording head scanning on the printing medium transported by the conveyor, and wherein the controller performs controlling on the conveyor to return the printing medium in a direction opposite to a direction where the printing medium for printing the test pattern in the transportation direction is transported, allows the area sensor to image the test pattern, and allows the reference color-measuring sensor to color-measure the test pattern.

8. The print control apparatus according to claim 1, wherein the controller generates the correction value based on a color measured result that is obtained by a difference between an average value of the plurality of the first pixels in the image information and the color measurement value of the test pattern.

9. The print control apparatus according to claim 1, wherein each of the plurality of the first pixels in the image information is finer than each of the plurality of the second pixels in the test pattern.

10. A print control apparatus comprising:

an area sensor that images a plurality of second pixels of a test pattern in an imaging range of the area sensor printed on a printing medium and generates image information of the test pattern as a plurality of first pixels with the first pixels being finer than the second pixels;

a reference color-measuring sensor that color-measures intensity of a reflected light in multiple wavelengths from the test pattern in a color-measuring range of the reference color-measuring sensor and obtains a reference color measurement value of the test pattern based on the intensity, the reference color-measuring sensor being more accurate than the area sensor in concentration of a color of the test pattern, the color-measuring range overlapping with the imaging range; and a controller that corrects a color of printing data of a printing image based on the image information and the reference color measurement value to form the printing image on the printing medium according to the printing data corrected, wherein the area sensor images the printing medium of a part where the test pattern is not printed and obtains the image information of the printing medium, and wherein the controller corrects a color of the printing image based on the information of the printing medium so that a difference of brightness is reduced by a position within the imaging range for obtaining the image information by the area sensor.

11. The print control apparatus according to claim 10, further comprising:

a carriage that relatively moves the area sensor and the reference color-measuring sensor against the test pattern, wherein the test pattern relatively moved in the imaging range is imaged by the area sensor, and wherein the test pattern relatively moved in the imaging range is color-measured by the reference color-measuring sensor.

12. The print control apparatus according to claim 11,
wherein the carriage includes a recording head forming the printing image on the printing medium is mounted, and
wherein the area sensor and the reference color-measuring sensor are mounted in the carriage.

13. The print control apparatus according to claim 12,
wherein a range for correcting a color of the printing image becomes a unit of a raster along the relative moving direction of the carriage and the printing medium.

14. The print control apparatus according to claim 12, further comprising:
a conveyor which conveys the printing medium in a predetermined transportation direction, the carriage being moved to scan in a relative moving direction different from the transportation direction,
wherein a length of the test pattern in the transportation direction is equal to or longer than that of a unit in which a formation of dots on the printing medium in the transportation direction is terminated, and
wherein when the length of the unit in the transportation direction is longer than the length of the imaging range, the controller corrects the color of the printing image based on a plurality of the image information and the reference color measurement values obtained, at least, by making transportation positions of the printing medium be different from each other and imaging the test pattern.

15. The print control apparatus according to claim 12, further comprising:
a conveyor which conveys the printing medium in a predetermined transportation direction, the carriage being moved to scan in the relative moving direction different from the transportation direction, and
wherein the controller corrects the color of the printing image based on, out of first image information and second image information obtained by making transportation positions of the printing medium different from each other so as to make parts of the imaging range overlap with each other and imaging the test pattern, the first image information and the second image information in which pieces of information having the overlapped ranges are averaged and the reference color measurement value.

16. The print control apparatus according to claim 12, further comprising:
a conveyor which conveys the printing medium in a predetermined transportation direction, the carriage being moved to scan in the relative moving direction different from the transportation direction, the recording head scanning on the printing medium transported by the conveyor,
wherein the controller performs controlling on the conveyor to return the printing medium in a direction opposite to a direction where the printing medium for printing the test pattern in the transportation direction is transported, allows the area sensor to image the test pattern, and allows the reference color-measuring sensor to color-measure the test pattern.

* * * * *